United States Patent
Pugsley et al.

(10) Patent No.: US 11,366,998 B2
(45) Date of Patent: Jun. 21, 2022

(54) NEUROMORPHIC ACCELERATOR MULTITASKING

(71) Applicant: Intel Corporation, Santa Clara, CA (US)

(72) Inventors: Seth Pugsley, Hillsboro, OR (US); Berkin Akin, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1095 days.

(21) Appl. No.: 15/937,486

(22) Filed: Mar. 27, 2018

(65) Prior Publication Data
US 2019/0042930 A1 Feb. 7, 2019

(51) Int. Cl.
G06N 3/08 (2006.01)
G06N 3/063 (2006.01)
G06N 3/04 (2006.01)

(52) U.S. Cl.
CPC ........... *G06N 3/0635* (2013.01); *G06N 3/049* (2013.01); *G06N 3/063* (2013.01); *G06N 3/084* (2013.01); *G06N 3/088* (2013.01)

(58) Field of Classification Search
CPC ...... G06N 3/0635; G06N 3/049; G06N 3/084; G06N 3/088
USPC ......................................................... 706/25
See application file for complete search history.

(56) References Cited

U.S. PATENT DOCUMENTS

| 9,430,736 | B2 * | 8/2016 | Thibeault | ................ G06N 3/063 |
| 2010/0095020 | A1 * | 4/2010 | Rixner | ............. H04L 29/12028 709/233 |
| 2012/0173471 | A1 * | 7/2012 | Ananthanarayanan | ...................... G06N 3/049 706/25 |
| 2013/0031040 | A1 * | 1/2013 | Modha | ................... G06N 3/049 706/27 |
| 2014/0081893 | A1 * | 3/2014 | Modha | ................... G06N 3/063 706/26 |
| 2014/0180984 | A1 * | 6/2014 | Arthur | ................... G06N 3/049 706/15 |
| 2017/0185891 | A1 * | 6/2017 | Hosokawa | ............. G06N 3/088 |

(Continued)

FOREIGN PATENT DOCUMENTS

| CN | 110309913 | 10/2019 |
| JP | 2019204492 | 11/2019 |

(Continued)

OTHER PUBLICATIONS

"European Application Serial No. 19157041.5, Response filed Mar. 31, 2020 to Extended European Search Report dated Aug. 19, 2019", 15 pgs.

(Continued)

*Primary Examiner* — Omar F Fernandez Rivas
*Assistant Examiner* — Em N Trieu
(74) *Attorney, Agent, or Firm* — Schwegman Lundberg & Woessner, P.A.

(57) ABSTRACT

Systems and techniques for neuromorphic accelerator multitasking are described herein. A neuron address translation unit (NATU) may receive a spike message. Here, the spike message includes a physical neuron identifier (PNID) of a neuron causing the spike. The NATU may then translate the PNID into a network identifier (NID) and a local neuron identifier (LNID). The NATU locates synapse data based on the NID and communicates the synapse data and the LNID to an axon processor.

25 Claims, 21 Drawing Sheets

(56) References Cited

U.S. PATENT DOCUMENTS

| | | |
|---|---|---|
| 2018/0075344 A1 | 3/2018 | Ma et al. |
| 2018/0082170 A1* | 3/2018 | Modha .................... G06N 3/04 |
| 2018/0174026 A1* | 6/2018 | Davies .................. G06N 3/063 |

FOREIGN PATENT DOCUMENTS

| | | |
|---|---|---|
| WO | 2014080300 | 5/2014 |
| WO | 2014189970 | 11/2014 |

OTHER PUBLICATIONS

"European Application Serial No. 19157041.5, Extended European Search Report dated Aug. 19, 2019", 9 pgs.

* cited by examiner

⟋ 705

NEURON ADDRESS TRANSLATION UNIT (NATU) TABLE

| PNID BEGIN | PNID END | NID | SYNAPSE SPACE BEGIN POINTER | SYNAPSE SPACE END POINTER |
|---|---|---|---|---|
| PNID_BEGIN,A | PNID_END,A | A | 0XA_BEGIN | 0XA_END |
| PNID_BEGIN,B | PNID_END,B | B | 0XB_BEGIN | 0XB_END |
| PNID_BEGIN,C | PNID_END,C | C | 0XC_BEGIN | 0XC_END |
| ⋮ | | ⋮ | | ⋮ |
| | | | | |

⟋ 710

SYNAPSE MEMORY SPACE

0XA_BEGIN — NETWORK A
0XA_END / 0XB_BEGIN — NETWORK B
0XB_END / 0XC_BEGIN — NETWORK C
0XC_END

NEUROMORPHIC ACCELERATOR MULTITASKING

TECHNICAL FIELD

The present disclosure relates generally to electronic hardware including neuromorphic hardware, and more specifically to neuromorphic accelerator multitasking.

BACKGROUND

A neuromorphic processor is a processor that is structured to mimic certain aspects of the brain and its underlying architecture, particularly its neurons and the interconnections between the neurons, although such a processor may deviate from its biological counterpart. A neuromorphic processor may be composed of many neuromorphic cores that are interconnected via a network architecture, such as a bus or routing devices, to direct communications between the cores. The network of cores truly communicate via short packetized spike messages sent from core to core. Each core may implement some number of primitive nonlinear temporal computing elements (e.g., neurons). When a neuron's activation exceeds some threshold level, it may generate a spike message that is propagated to a set of fan-out neurons contained in destination cores. The network then may distribute the spike messages to destination neurons and, in turn, those neurons update their activations in a transient, time-dependent manner. Artificial neural networks (ANNs) that operate via spikes may be called spiking neural networks (SNNs).

SNNs may use spike time dependent plasticity (STDP) to train. STDP updates synaptic weights—a value that modifies spikes received at the synapse to have more or less impact on neuron activation than the spike alone—based on when, in relation to neuron activation (e.g., an outbound spike) an incoming spike is received. Generally, the closer to the outbound spike that the inbound spike is received, the greater the corresponding synapse weight is modified. If the inbound spike precedes the outbound spike, the weight is modified to cause a future spike at that synapse to be more likely to cause a subsequent outbound spike. If the inbound spike follows the outbound spike, the corresponding synapse weight is modified to cause a future spike at the synapse to be less likely to cause a subsequent outbound spike. These relationships dampen noise (e.g., incoming spikes that follow the outbound spike had no part in creating the outbound spike and may be considered noise) while reinforcing pattern participants.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Neuromorphic accelerators (e.g., neuromorphic processors or processing clusters) may be organized in a number of ways to approach the speed and connectivity of biological neural networks. Efficiently packing millions of neurons and billions of inter-neuron connections in hardware may be difficult. Embodiments detailed herein describe a neuromorphic architecture that uses external memory resources in the processing operations of a neuromorphic architecture. As a result, the creation of a very large neural network, even into multi-millions or multi-billions of neurons, may be launched and utilized with use of a single accelerator chip. This is possible because the present approaches enable a "fanned-out" rather than a "fanned-in" neuromorphic accelerator architecture, to allow the many synapse states associated with the various neurons to be distributed to external memory. Additionally, aspects of spatial locality associated with synapses may be exploited in the present approaches by storing information from such synapses in an organized form in the external memory (e.g., in contiguous memory locations).

A SNN, in its basic form, resembles a graph with nodes and edges. In an SNN, the nodes are called neurons, and the edges between neurons are called synapses. A neuron is adapted to perform two functions: accumulate "membrane potential," and "spike." The membrane potential (also referred to as simply "potential") may resemble an accumulating counter, such that when the potential becomes high enough, the neuron spikes. This spiking neuron is commonly referred to as a "presynaptic neuron." When the presynaptic neuron spikes, it sends out spike messages along all of the presynaptic neuron's outgoing connections to all target neurons of the presynaptic neuron, called "postsynaptic neurons." Each of these messages has a "weight" associated with it, and these weights may be positive or negative, increasing or decreasing the postsynaptic neuron's potential. Additionally, time is an important aspect of SNNs, and some spike messages may take longer to arrive at the postsynaptic neuron than others, even if they were sent from the presynaptic neuron at the same time.

Figure 2:
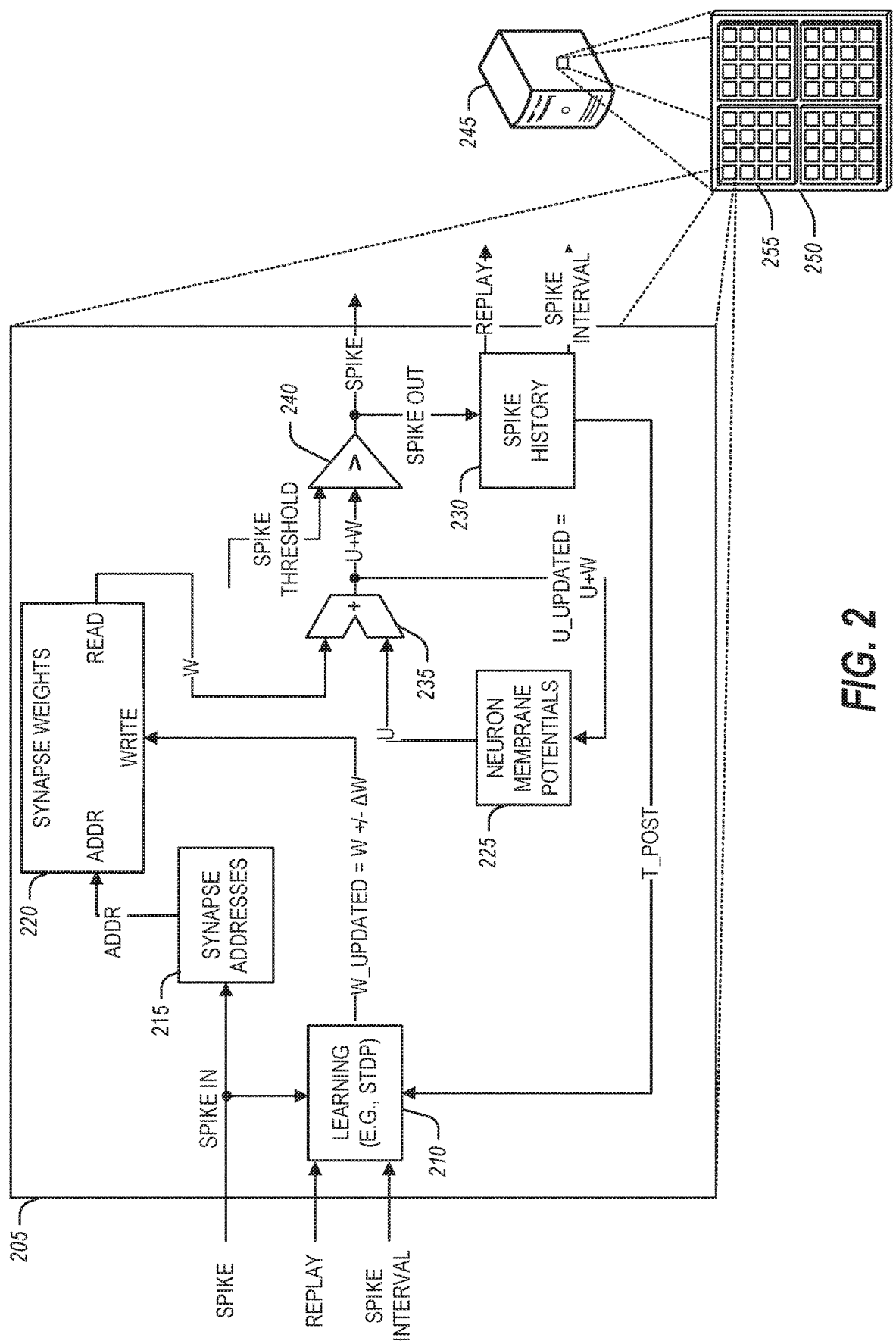
FIG. 2 illustrates a high-level diagram of a model neural core structure, according to an embodiment.
Figure 3:
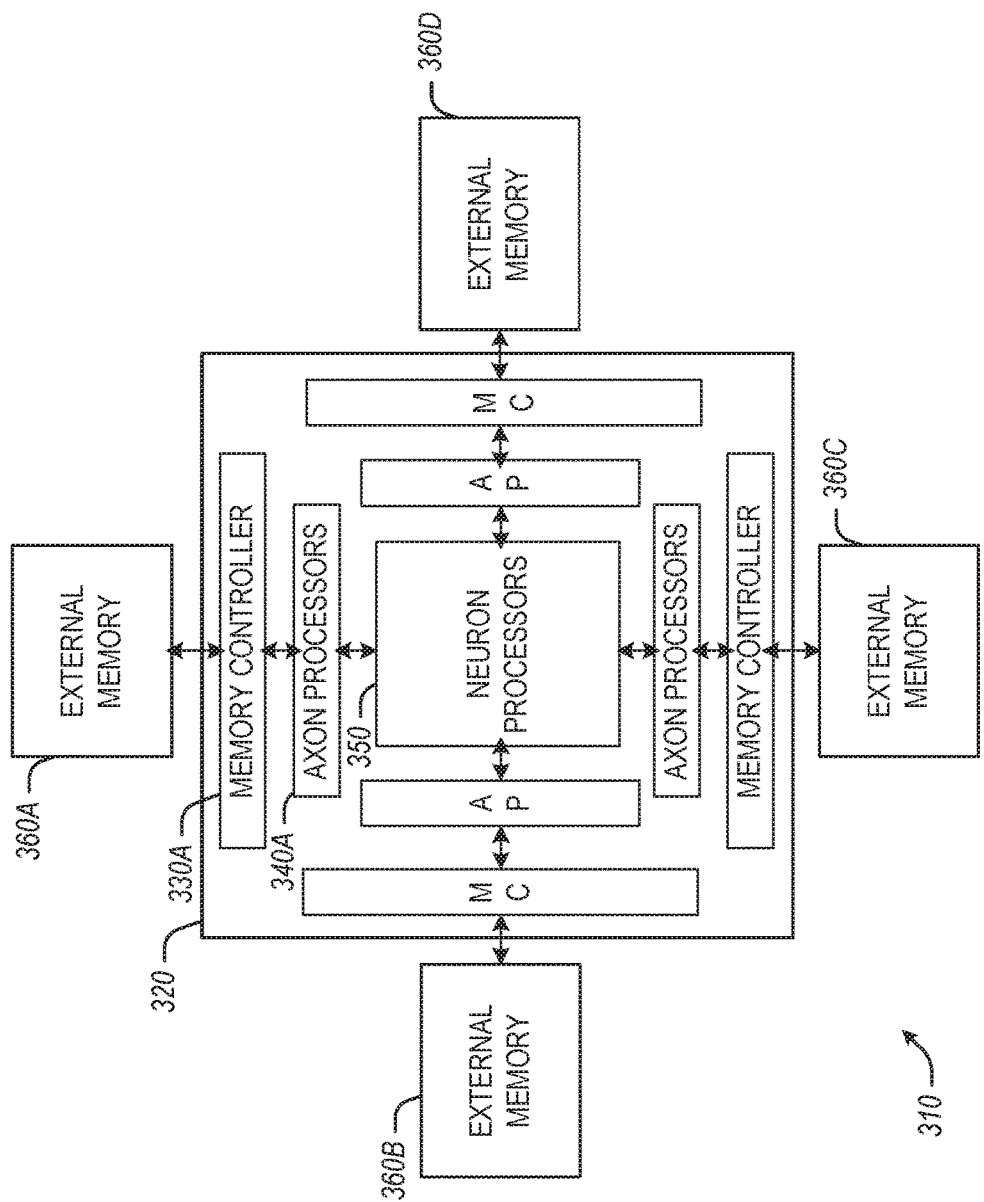
FIG. 3 illustrates an overview of a neuromorphic architecture design for a spiking neural network, according to an embodiment.
Figure 4A:
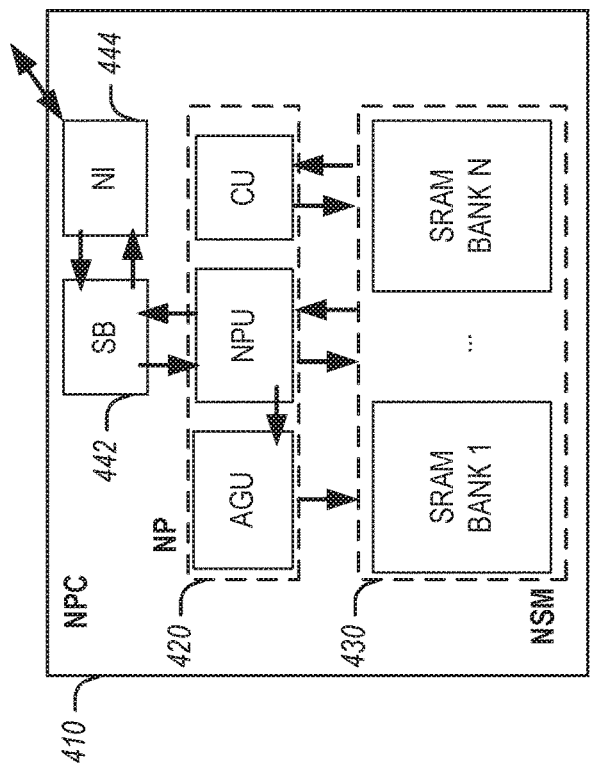
FIG. 4A illustrates a configuration of a Neuron Processor Cluster for use in a neuromorphic hardware configuration, according to an embodiment.
Figure 4B:
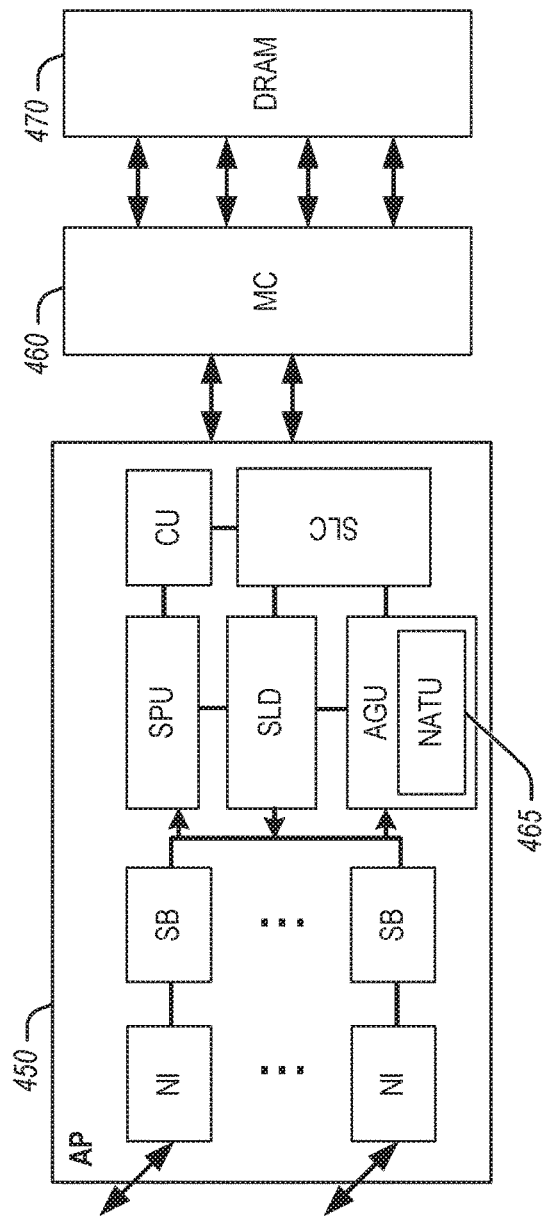
FIG. 4B illustrates a configuration of an Axon Processor for use in a neuromorphic hardware configuration, according to an embodiment.
Figure 5:
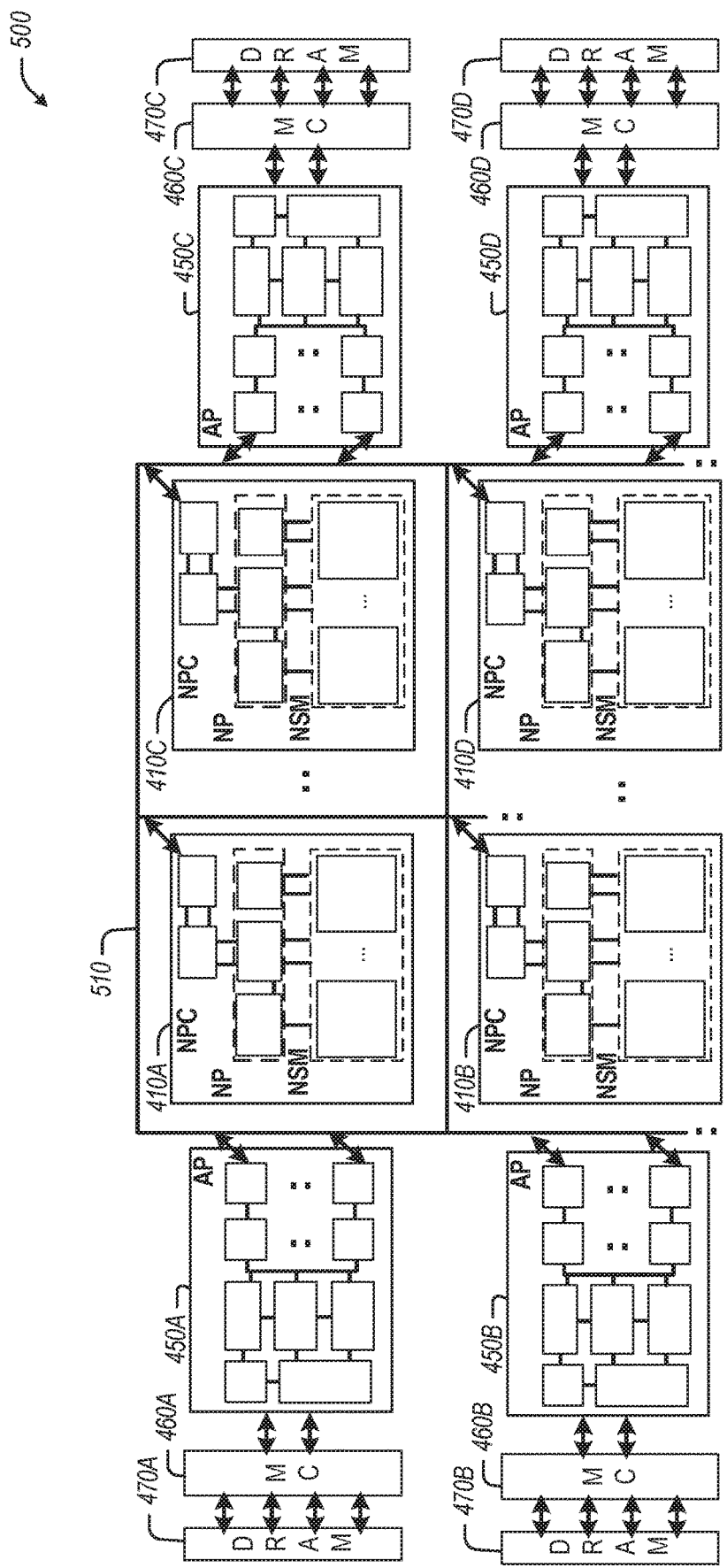
FIG. 5 illustrates a system-level view of the neuromorphic hardware configuration of FIGS. 3 to 4B, according to an embodiment.

The following configurations, specifically as detailed in FIGS. 3 to 5, provide a configuration of an accelerator chip for implementing a SNN that stores synaptic data with external memory. The context in which a SNN operates, and an overall architecture of a SNN as implemented in neuromorphic hardware, is provided in FIGS. 1 and 2 and discussed in the following paragraphs. Also, as used herein, references to "neural network" for at least some examples is specifically meant to refer to a SNN; thus, many references herein to a "neuron" are meant to refer to an artificial neuron in a SNN. It will be understood, however, that certain of the following examples and configurations may also apply to other forms or variations of artificial neural networks.

While the above architecture enables an efficient modeling of many neurons and connections, the generally sparse signaling behavior of SNNs may lead to idle hardware. To address this issue, multiple SNNs may be run on the same hardware. Issues of efficient neuron addressing between different SNNs on the same hardware may be overcome with a combined local addressing (e.g., intra-SNN addressing) and physical addressing (e.g., global or hardware addressing) technique implemented by a network address translation unit (NATU)—also known as network address translation circuitry (NATC). Thus, a SNN may store inter-neuron connections using a local address in, for example, the synapse data for that SNN. Another SNN may do the same. However, the NATU may translate between the local network identifiers (LNIDs) to physical network identifiers (PNIDs) in order to address neuron processors processing the neuron data. Because the NATU provides data separation for the different SNNs on the same hardware, several SNNs may be concurrently executed on the hardware without any special design of the SNNs themselves. Thus, hardware utilization may be increased via the addition of SNNs, or SNN multitasking.

An example use case for multiple SNNs on the neuromorphic hardware is cloning an SNN. In a cloned SNN, copies of neuron state are made and maintained. Thus, the two SNNs may operate concurrently without interfering with input processing. However, in order for the networks to behave similarly, the cloned SNNs may share synapse data. This enables both networks to respond similarly to similar data, conserves synapse data space—because the synapse data is shared between two networks—and even enables efficient training on different data sets. For example, if the first cloned SNN is training on data set A, the second SNN may concurrently train on data set B. Because both SNNs update the shared synapse data to implement STDP, the first network is training on data set B by virtue of the second network's updates to the synapse data from processing the data set B.

Figure 1:
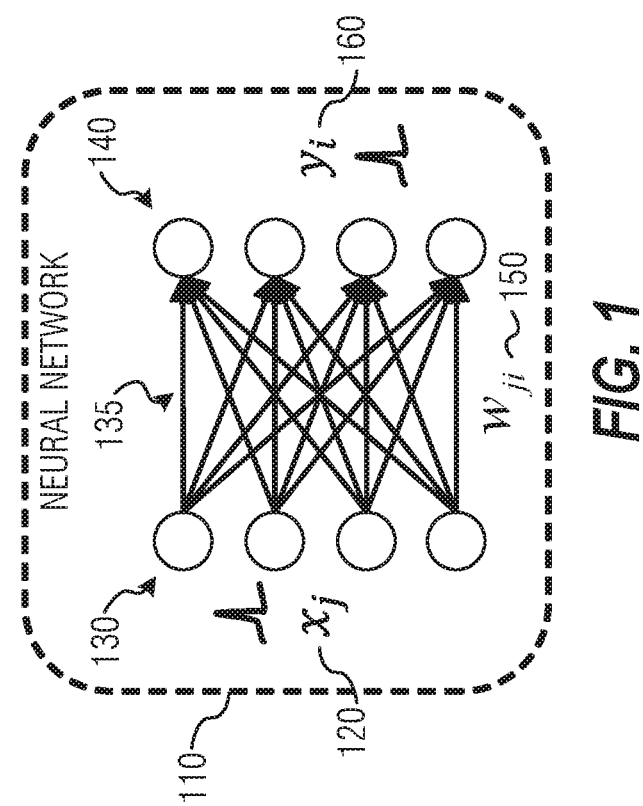
FIG. 1 illustrates an example diagram of a simplified neural network, according to an embodiment.

FIG. 1 illustrates an example diagram of a simplified neural network 110, providing an illustration of connections 135 between a first set of nodes 130 (e.g., neurons) and a second set of nodes 140 (e.g., neurons). Neural networks (such as the simplified neural network 110) are commonly organized into multiple layers, including input layers and output layers. It will be understood that the simplified neural network 110 only depicts two layers and a small numbers of nodes, but other forms of neural networks may include a large number of nodes, layers, connections, and pathways.

Data that is provided into the neural network 110 is first processed by synapses of input neurons. Interactions between the inputs, the neuron's synapses, and the neuron itself govern whether an output is provided to another neuron. Modeling the synapses, neurons, axons, etc., may be accomplished in a variety of ways. In an example, neuromorphic hardware includes individual processing elements in a synthetic neuron (e.g., neurocore) and a messaging fabric to communicate outputs to other neurons. The determination of whether a particular neuron "fires" to provide data to a further connected neuron is dependent on the activation function applied by the neuron and the weight of the synaptic connection (e.g., $w_{ij}$ 150) from neuron j (e.g., located in a layer of the first set of nodes 130) to neuron i (e.g., located in a layer of the second set of nodes 140). The input received by neuron j is depicted as value $x_j$ 120, and the output produced from neuron i is depicted as value $y_i$ 160. Thus, the processing conducted in a neural network is based on weighted connections, thresholds, and evaluations performed among the neurons, synapses, and other elements of the neural network.

In an example, the neural network 110 is established from a network of SNN cores, with the neural network cores communicating via short packetized spike messages sent from core to core. For example, each neural network core may implement some number of primitive nonlinear temporal computing elements as neurons, so that when a neuron's activation exceeds some threshold level, it generates a spike message that is propagated to a fixed set of fanout neurons contained in destination cores. The network may distribute the spike messages to all destination neurons, and in response those neurons update their activations in a transient, time-dependent manner, similar to the operation of real biological neurons.

The neural network 110 further shows the receipt of a spike, represented in the value $x_j$ 120, at neuron j in a first set of neurons (e.g., a neuron of the first set of nodes 130). The output of the neural network 110 is also shown as a spike, represented by the value $y_i$ 160, which arrives at neuron i in a second set of neurons (e.g., a neuron of the first set of nodes 140) via a path established by the connections 135. In a spiking neural network all communication occurs over event-driven action potentials, or spikes. In an example, the spikes convey no information other than the spike time as well as a source and destination neuron pair. Computation occurs in each neuron as a result of the dynamic, nonlinear integration of weighted spike input using real-valued state variables. The temporal sequence of spikes generated by or for a particular neuron may be referred to as its "spike train."

In an example of a SNN, activation functions occur via spike trains, which means that time is a factor that has to be considered. Further, in a SNN, each neuron may be modeled after a biological neuron, as the artificial neuron may receive its inputs via synaptic connections to one or more "dendrites" (part of the physical structure of a biological neuron), and the inputs affect an internal membrane potential of the artificial neuron "soma" (cell body). As previously discussed, in a SNN, the artificial neuron "fires" (e.g., produces an output spike), when its membrane potential crosses a firing threshold. Thus, the effect of inputs on a SNN neuron operates to increase or decrease the internal membrane potential, making the neuron more or less likely to fire. Further, in a SNN, input connections may be stimulatory or inhibitory. A neuron's membrane potential may also be affected by changes in the neuron's own internal state ("leakage").

In some examples, the neural network may utilize spikes in a neural network pathway to implement learning using a learning technique such as spike timing dependent plasticity (STDP). For instance, a neural network pathway may utilize one or more inputs (e.g., a spike or spike train) being provided to a presynaptic neuron $X_{PRE}$ for processing; the neuron $X_{PRE}$ causes a first spike, which is propagated to a neuron $X_{POST}$ for processing; the connection between the neuron $X_{PRE}$ and the postsynaptic neuron $X_{POST}$ (e.g., a synaptic connection) is weighted based on a weight. If inputs received at neuron $X_{POST}$ (e.g., received from one or multiple connections) reach a particular threshold, the neuron $X_{POST}$ will activate (e.g., "fire"), causing a second spike.

The determination that the second spike is caused as a result of the first spike may be used to strengthen the connection between the neuron $X_{PRE}$ and the neuron $X_{POST}$ (e.g., by modifying a weight) based on principles of STDP. Specifically, STDP may be used to adjust the strength of the connections (e.g., synapses) between neurons in a neural network, by correlating the timing between an input spike (e.g., the first spike) and an output spike (e.g., the second spike). In further examples, the weight may be adjusted as a result of long-term potentiation (LTP), long term depression (LTD), or other techniques. A neural network pathway, when combined with other neurons operating on the same principles, may exhibit natural unsupervised learning as repeated patterns in the inputs will have pathways strengthened over time. Conversely, noise, which may produce the spike on occasion, will not be regular enough to have associated pathways strengthened.

FIG. 2 illustrates a high-level diagram of a model neural core structure, according to an embodiment. The following neural core structure may implement additional techniques and configurations, such as is discussed below for SNN multitasking and SNN cloning. Thus, the diagram of FIG. 2 is provided as a simplified example of how neuromorphic hardware operations may be performed.

In an example, a neural-core 205 may be on a die with several other neural cores to form a neural-chip 255. Several neural-chips 255 may be packaged and networked together to form neuromorphic hardware 250, which may be included in any number of devices 245, such as servers, mobile devices, sensors, actuators, etc. The neuromorphic hardware 250 may be a primary processor of these devices (e.g., processor 1002 described below with respect to FIG. 10), or may be a co-processor or accelerator that compliments another processor of these devices. The illustrated neural-core structure functionally models the behavior of a biological neuron in the manner described above. A signal is provided at an input (e.g., ingress spikes, spike in, etc.) to a synapse (e.g., modeled by synaptic weights 220 in a synaptic variable memory) that may result in fan-out connections within the core 205 to other dendrite structures with appropriate weight and delay offsets (e.g., represented by the synapse addresses 215 to identify to which synapse a dendrite corresponds). The signal may be modified by the synaptic variable memory (e.g., as synaptic weights are applied to spikes addressing respective synapses) and made available to the neuron model. For instance, the combination of the neuron membrane potentials 225 may be multiplexed 235 with the weighted spike and compared 240 to the neuron's potential to produce an output spike (e.g., egress spikes via an axon to one or several destination cores) based on weighted spike states.

In an example, a neuromorphic computing system may employ learning 210 such as with the previously described STDP techniques. For instance, a network of neural network cores may communicate via short packetized spike messages sent from core to core. Each core may implement some number of neurons, which operate as primitive nonlinear temporal computing elements. When a neuron's activation exceeds some threshold level, the neuron generates a spike message that is propagated to a set of fan-out neurons contained in destination cores. In managing its activation level, a neuron may modify itself (e.g., modify synaptic weights) in response to a spike. These operations may model a number of time-dependent features. For example, following a spike, the impact of PRE spike may decay in an exponential manner. This exponential decay, modeled as an exponential function, may continue for a number of time steps, during which additional spikes may or may not arrive.

The neural-core 205 may include a memory block that is adapted to store the synaptic weights 220, a memory block for neuron membrane potentials 225, integration logic 235, threshold logic 240, on-line learning and weight update logic based on STDP 210, and a spike history buffer 230. With the techniques discussed herein (e.g., with reference to FIGS. 3 to 5, below), the synaptic weights 220 and membrane potentials 225 may be divided between on-chip neuron state data (e.g., stored in internal SRAM) and off-chip synapse data (e.g., stored in DRAM).

In a specific implementation, when a spike from a pre-synaptic neuron is received, the synaptic weight is accessed and is added to the post-synaptic neuron's membrane potential (u). An outgoing spike is generated if the updated (u) is larger than a pre-set spike threshold. The outgoing spike resets a spike history buffer, which counts how many time-steps have passed since the last time each neuron in the core has spiked ($t_{POST}$). In a further example, the neural-core may implement variations of on-line (e.g., in chip) learning operations performed in the proposed core, such as LTD, single PRE spike LTP, or multiple PRE spike LTP.

The new synaptic weights, as computed by Δw, are installed in the synaptic memory to modify (e.g., weight) future PRE spikes, thus modifying the likelihood that a particular combination of PRE spikes causes a POST spike. The network distributes the spike messages to destination neurons and, in response to receiving a spike message, those neurons update their activations in a transient, time-dependent manner, similar to the operation of biological neurons.

The basic implementation of some applicable learning algorithms in the neural-core 205 may be provided through STDP, which adjusts the strength of connections (e.g., synapses) between neurons in a neural network based on correlating the tinting between an input (e.g., ingress) spike and an output (e.g., egress) spike. Input spikes that closely precede an output spike for a neuron are considered causal to the output and their weights are strengthened, while the weights of other input spikes are weakened. These techniques use spike times, or modeled spike times, to allow a modeled neural network's operation to be modified according to a number of machine learning modes, such as in an unsupervised learning mode or in a reinforced learning mode.

In further example, the neural-core 205 may be adapted to support backwards-propagation processing. In biology, when the soma spikes (e.g., an egress spike), in addition to that spike propagating downstream to other neurons, the spike also propagates backwards down through a dendritic tree, which is beneficial for learning. The synaptic plasticity at the synapses is a function of when the postsynaptic neuron fires and when the presynaptic neuron is firing—the synapse knows when the neuron is tired. Thus, in a multi-compartment architecture, once the soma fires, there are other elements that know that the neuron fired in order to support learning, e.g., so all of the input fan-in synapses may see that the neuron fired. The learning component 210 may implement STDP and receive this backwards action potential (bAP) notification (e.g., via trace computation circuitry) and communicate with and adjust the synapses accordingly. However it will be understood that changes to the operational aspects of the neural-core 205 may vary significantly, based on the type of learning, reinforcement, and spike processing techniques used in the type and implementation of neuromorphic hardware.

FIG. 3 illustrates an overview of a neuromorphic architecture 310 for a spiking neural network. Specifically, the architecture depicts an accelerator chip 320 arranged for storing and retrieving synaptic data of neural network operations in external memory.

The accelerator chip 320 is arranged to include three types of components: Neuron Processors 350, Axon Processors (APs) 340 (e.g., a first set of axon processors 340A), and Memory Controllers (MCs) 330 (e.g., a first memory controller 330A), in addition to necessary interconnections among these components (e.g., a bus). In the architecture 310, the work of processing functions of the SNN is configured to be divided between the Neuron Processors 350 and the Axon Processors 340 with the following configurations.

In an example, each Axon Processor 340 is arranged to be tightly coupled to one physical channel of External Memory 360 (e.g., as indicated with respective sets of memory 360A, 360B, 360C, 360D), with the respective Axon Processor 340 being in charge of processing the spikes whose synapse data resides in that channel of memory. The external memory 360 may constitute respective sets or arrangements of high-performance DRAM (e.g., High Bandwidth Memory (HBM) standard DRAM, Hybrid Memory Cube (HMC) standard DRAM, etc.); in other examples, the external memory 360 may constitute other forms of slower but denser memory (including stacked phase-change memory (e.g., implementing the 3D XPoint standard), DDRx-SDRAM, GDDRx SDRAM, LPDDR SDRAM, direct through-silicon via (TSV) die-stacked DRAM, and the like).

In addition to the processing being split between multiple components in the accelerator chip 320, the storage of the various SNN states is also divided. Neuron state is stored on-chip adjacent to the Neuron Processors 350, such as in an on-chip SRAM implementation (not shown); synapse data, however, is stored in the external memory 360. This division is performed for two primary reasons: the size of the data, and the locality of the data.

Synapse data takes up orders of magnitude more memory space than neuron state data. Also, the synapse data is accessed with high spatial locality, but no temporal locality, whereas the neuron data is accessed with no spatial locality, but high temporal locality. Further, there is a strong notion of time in SNNs, and some spike messages take more time to generate and propagate than others. In the SNN accelerator 300, similar to conventional SNN accelerator designs, time is broken up into discrete, logical "time steps." During each time step, some spike messages will reach their target, and some neurons may spike. These logical time steps each take many accelerator clock cycles to process. Storage of the synapse data may be appropriate in the external memory 360 during relatively large amounts of time where such data is not being used.

A significant neuromorphic processing problem solved with the configuration of the SNN accelerator 300, however, is the balance of network size and programmability. In some SRAM-based SNN accelerators, in order to achieve even moderate neural network sizes, constraints are placed on the connections that may and cannot be made between neurons (i.e., synapse programmability). These constraints may take the form of synapse sharing between neurons, limited connectivity matrices, or restrictive compression demands. In other words, each neuron is prevented from having a unique set of synapses connecting the neuron to a set of arbitrary target neurons. The increased capacity of external memory banks allows for the flexibility of far greater expansions to the SNN, where each synapse is defined by a unique <target, weight> pair. However, the same techniques used for managing synapses and neuron states in SRAM-based SNN accelerators may be used within the SNN accelerator 300, further multiplying the already very large effective capacity that the SNN accelerator 300 provides with the External Memory 360.

In the External Memory 360, each neuron has a list of <target, weight> pairs specifying its synapses. This list is further organized in the memory by time step (also referred to as a "delay slot"), where all of the synapses that will "arrive" at their postsynaptic neuron at the same time are stored in memory next to each other. For instance, the synaptic data may be stored in contiguous or consecutive memory blocks, or in locations in the memory that allow writing or reading to occur with a reduced number of operations or amount of time. In an example, during each given time step of the neural network, all of the synapses of a presynaptic neuron that will arrive during that time step are fetched from the External Memory 360; whereas none of the synapses pertaining to other time steps are fetched from the External Memory 360.

The <target, weight> tuple provides a straightforward way to address connections between neurons. When multiple SNNs are hosted by the neuromorphic hardware 310 to enable SNN multitasking, a mechanism to distinguish between different SNNs is needed. An example may designate global neuron addresses in the "target" field. However, this approach involves the different SNNs to be designed with consideration for the underlying hardware and other SNNs. A solution to this problem is network address translation, translating between intra-network neuron addresses and global (e.g., physical) neuron addresses to enable the individual SNNs to simply address their own neurons using the local addresses while the neuromorphic hardware may continue to using global neuron addresses to implement the underlying processing tasks. Additional examples are discussed below with respect to FIGS. 4B and 6A-8.

As an example of operation of the SNN accelerator chip architecture 310, consider the moment that a presynaptic neuron spikes. As discussed above, a neuron spikes because its potential rose above a predetermined (programmable) threshold, as determined by the Neuron Processor 350 where that neuron is maintained. When the neuron spikes, it sends a spike message (including the presynaptic neuron's ID) to the Axon Processor 340 connected to the channel of memory where its synapse data is maintained (e.g., a particular Axon Processor 340A included in the set of Axon Processors 340). This particular Axon Processor 340A adds the spiking neuron ID to a list of spiking neurons, and will begin processing its first delay slot synapses during the next time step.

When the next time step begins, the particular Axon Processor 340A fetches (e.g., from the External Memory 360A via the Memory Controller 330A) the synapses pertaining to the presynaptic neuron's current delay slot, but the Axon Processor 340A does not yet fetch the synapses for other delay slots. The presynaptic neuron ID remains in the Axon Processor's list of spiking neurons for several more time steps, until all of its delay slots have been fetched and processed. As the per-time step synapse list is being fetched, the Axon Processor 340A reads the list of <target, weight> pairs to create spike messages, which are sent out to postsynaptic neurons with the specified weight, thus pre-applying the synapse weights of the recipient postsynaptic neurons. Each such spike message leaves the Axon Processor 340A and goes back into the Neuron Processors 350, where it finds the particular Neuron Processor 350 in charge of the particular postsynaptic neuron.

Once the spike message is delivered, the particular Neuron Processor 350 will fetch the postsynaptic neuron's state from a local SRAM (not shown); this Neuron Processor will then modify the target neuron's potential according to the weight of the spike message, and then write the neuron state back to its local SRAM. At the end of each time step, all of the neurons in all of the Neuron Processors 350 must be scanned to see if they spiked during that time step. If they have, the neurons send a spike message to the appropriate. Axon Processor 340, and the whole process begins again. If a neuron does not spike during this time step, then its potential will be reduced slightly, according to some "leak" function. Other variations to the operation of the neural network may occur based on the particular design and configuration of such network.

In an example, a neuromorphic hardware configuration of the SNN accelerator 300 may be implemented (e.g., realized) through an accelerator hardware chip including a plurality of neuromorphic cores and a network to connect the respective cores. As discussed in the following configurations, a respective neuromorphic core may constitute a "neuron processor cluster" (hereinafter, NPC), to perform the operations of the neuron processors 350, or an "axon processor" (AP), to perform the operations of the axon processors 340. Thus, in contrast to a conventional neuromorphic hardware design where a single core type—distributed across a network—includes processing capabilities for both neurons and axons, the present design includes two core types distributed across a network that are separated into neuron and axon functions.

FIG. 4A illustrates an example configuration of a Neuron Processor Cluster (NPC) for use in the present neuromorphic hardware configuration (e.g., the architecture 310 discussed in FIG. 3). As shown, the NPC 410 is comprised of three main components: one or more Neuron Processors 420 (NPs), an SRAM-based Neuron State Memory 430 (NSM), and a connection to the on-chip network (the Network Interface (NI) 444 and Spike Buffer (SB) 442). In an example, processing of all neurons is performed in a time multiplexed fashion, with an NP 420 fetching neuron state from the NSM 430, modifying the neuron state, and then writing the neuron state back before operating on another neuron. The NSM 430 may be multi-banked to facilitate being accessed by more than one NP 420 in parallel.

When a spike message arrives at the NPC 410, the spike message is buffered at the SB 442 until the message may be processed. An Address Generation Unit (AGU) determines the address of the postsynaptic neuron in the NSM 430, whose state is then fetched, and then the Neuron Processing Unit (NPU) adds the value of the spike's weight to the postsynaptic neuron's potential before writing the neuron state back to the NSM 430. At the end of the current time step, all neurons in all NPCs are scanned by the NPUs to see if their potential has risen above the spiking threshold. If a neuron does spike, a spike message is generated, and sent to the appropriate Axon Processor via the NI 444.

In an example, the NPU is a simplified arithmetic logic unit (ALU) which only needs to support add, subtract, shift and compare operations at a low precision (for example, 16-bits). The NPU is also responsible for performing membrane potential leak for the leaky-integrate-fire neuron model. Due to time multiplexing, the number of physical NPUs is smaller than the total number of neurons. Finally, a Control Unit (CU) orchestrates the overall operation within the NPC, which may be implemented as a simple finite-state machine or a micro-controller.

FIG. 4B illustrates an example configuration of an Axon Processor (AP) 450 for use in the present neuromorphic hardware configuration (e.g., the architecture 310 discussed in FIG. 3). The Axon Processor (AP) 450 includes a memory pipeline for storing and accessing the synaptic data, as the synaptic state is stored in an external high bandwidth memory and accessed via various Axon Processors (AP). For example, as shown in FIG. 4B, the AP 450 is connected to DRAM 470 via a Memory Controller (MC) 460.

Similar to the NPC 410, the AP 450 employs NIs and SBs to send and receive spike messages to/from the network-on-chip. In order to generate the spike messages to send to the postsynaptic neurons, an AGU first generates the corresponding address for a synapse list of the presynaptic neuron (a "synapse list"). The synapse list may include headers containing information regarding the length, connectivity, type, etc. of the synapses. A Synapse List Decoder (SLD) is responsible for parsing the synapse list and identifying such headers, target neuron IDs, synaptic weights and so on. The SLD works in conjunction with the AGU to fetch the entire synapse list. Synapse list sizes may vary between presynaptic neurons.

In an example, synapse lists are organized as delay slot-ordered, so the AP 450 will fetch only the list of synapses for the current delay slot, which is temporarily buffered at a Synapse List Cache (SLC). The AP 450 sends out spike messages of the current delay slot to the network. If the SNN size is small enough, and the SLC is large enough, synapses in the next delay slots may be pre-fetched and kept in the SLC. Reading a synapse list from the External Memory (the DRAM 470) has very good spatial locality, leading to high bandwidth.

To implement SNN multitasking, the AGU of the AP 450 may include a network address translation unit (NATU) 465. The NATU 465 is electronic hardware (e.g., processing circuitry or a circuit set as described below with respect to FIG. 10) that provides address translation between local neuron identifiers (LNIDs) used within a single SNN, and physical neuron identifiers (PNIDs) used by the NPC 410 to locate an NPU corresponding to a neuron. To implement neural network multitasking, the NATU 465 is arranged to receive a spike message, for example, via a first interface (e.g., wire, bus, interconnect, etc.). The spike message may arrive at the NATU via the AP 450 from the NPC 410. Here, the spike message includes a PNID of a neuron causing the spike.

The NATU 465 is arranged to translate the PNID into a network identifier (NID) and a LNID. The NID identifies to which of several neural networks concurrently implemented by the NPC 410 the spike message originated. The LNID is an intra-network identifier for the neuron generating the spike message. Thus, the LNID may be used within a network such that two different neural networks may have neurons with the same LNID. However, the combination of NID and LNID for each of these neurons will be different because the NIDs are different. This arrangement enables the various networks to address neuron members without concern for neuron address collisions.

Figure 7:
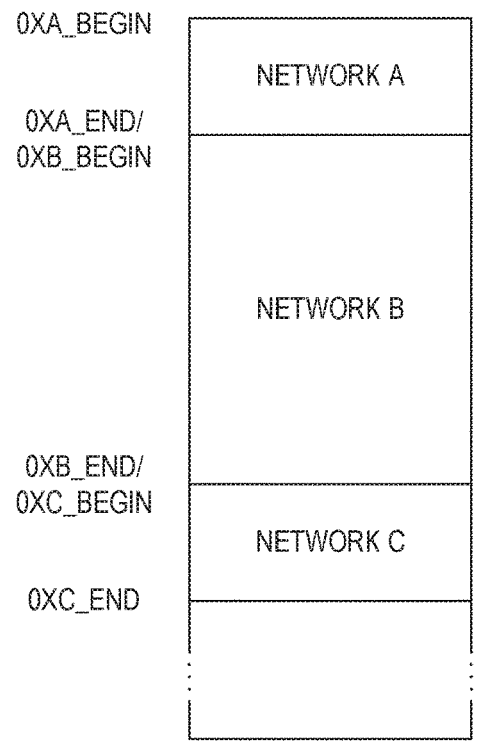
FIG. 7 illustrates a NATU table and synapse memory space arrangements for local network to physical network translations, according to an embodiment.

The NATU 465 is arranged to translate the PNID into the NID and the LNID by comparing the PNID to a set of PNID ranges. Here, each PNID range corresponds to a unique NID. Here, the NATU 465 may include, or have access to, a table or set of registers to hold the PNID start and stop values for a given NID. FIG. 7 illustrates just such a NATU table. Thus, the NATU 465 may, given a PNID, compare the PNID_begin and PNID_end values for each NID to locate the appropriate NID. In an example, the LNID may be an offset within the PNID range for a given NID. Thus, for example, if 105 is a PNID address being evaluated by the NATU 465, and falls with the range of NID B with a PNID_begin of 100 and a PNID_end of 115, then the LNID for 105 is 5, being the fifth PNID within the range of 100-115. Thus, the PNID to LNID translation may include subtracting the PNID_begin value, of a corresponding PNID rang, from the PNID. Similarly, given an LNID and the NID, the PNID_begin value that corresponds to the NID may be added to the LNID to arrive at the PNID.

In an example, to translate the PNID into the NID and the LNID, the NATU 465 is arranged to remove a number of bits corresponding to a NID length from an end of the PNID. In this example, the PNID is a concatenation of the NID and LNID, such that, for example, the PNID is the NID bits followed by the LNID bits, or the LNID bits followed by the NID bits. While this arrangement is straightforward and lends itself to an efficient hardware implementation, it may be somewhat inflexible because a reserved number of bits for the NID entails design choices of how many different networks may be hosted—based on the size of the NID—and how many neurons each network may have—based on the size of the LNID.

The NATU 465 is arranged to locate synapse data pertinent to the spike message based on the NID. In an example, the synapse data includes a memory address range. Here, the synapse data for the entire neural network corresponding to the NID is contiguous in the RAM 470. Again, an example of this is illustrated in FIG. 7, where the NATU table entry for a NID includes a begin and an end address for the memory that contains synapse data for that NID. Once the synapse data for the entire neural network corresponding to the NID is located, the NATU 465 is arranged to communicate the synapse data to the AP 450, for example, by providing the addresses. The AP 450 may then employ the MC 460 to retrieve the synapse data, or the AGU to determine what subset of the synapse data is pertinent to the spike message, and then use the MC 460 to retrieve the subset from memory 470.

The NATU 465 is arranged to determine that a second spike message is addressed to the LNID based on a synapse structure located from the synapse data. This is an in-bound path of the spike message where the result will arrive at the NPC 410 as opposed to the out-bound—from the NPC 410 (or other processing circuitry) to the AP 450—described above. Here, the NATU 465 is arranged to translate the LNID into the PNID using the NID that corresponds to the synapse data. This reverse process, of creating a PNID from the LNID and a known NID, enables the NPC 410 to operate without modification and still support neural network multitasking. In an example, to translate the LNID into the PNID, the NATU 465 is arranged to concatenate the NID onto an end (e.g., the head or the tail) of the LNID. In an example, the NATU 465 is arranged to communicate the second spike message to the AP 450 using the PNID to identify the destination neuron. This communication may be performed via a second interface of the NATU. In an example, the first interface and the second interface of the NATU are the same interface.

In the course of processing a spike, an AP 450 may dispatch several spike messages to the network which will be consumed by several NPCs. Hence, each AP 450 may have multiple drop-off points to the network (i.e., multiple NIs and SBs) to account for any bandwidth imbalance between NPC 410 and AP 450.

Additionally, the AP 450 may include a Synaptic Plasticity Unit (SPU) which is responsible for providing updates to the synaptic data. These updates may include incrementing, decrementing, pruning, and creating synaptic connections. The SPU may implement various learning rules including spike-timing dependent plasticity (STDP), short/long term depression/potentiation, or the like. SPU updates also may be performed on the synaptic data fetched from memory, before writing it back, to eliminate additional read-modify-writes.

As noted above, an example use case for neural network multitasking includes neural network cloning. Cloning includes the reproduction of a portion of a first neural network to a second neural network in the neuromorphic hardware, and then running both networks on the neuromorphic hardware. An example of cloning may include copying the neural states (e.g., from the NSM 430) or the synaptic states (e.g., from memory 470) to a new location and assigning a new NID with NATU information (e.g., as illustrated in FIG. 7) that points the new NID to these different neural state and synaptic state ranges.

An example of cloning, however, may include the different neural networks sharing synapse state between distinct neural states. Thus, the neuron states of the two networks are separate, but the synapses are shared. This may be accomplished by copying the neural state of one network to another portion of the NSM 430, but having identical entries for the synapse pointers in the NATU information. An example of this is illustrated in FIG. 8. To implement this example of neural network cloning, the NATU 465 is arranged to receive a neural network clone indication that includes the NID. The NATU 465 is then arranged to establish a second neuron memory, equivalent to a first neuron memory corresponding to the NID, to a second region of a memory that contains neuron memory. This equivalence may be in size only, or in content. Thus, in an example, to establish the second neuron memory, the NATU 465 is arranged to copy the first neuron memory to the second neuron memory location. However, aspects of the neuron memory may be changed during the cloning. Thus, in an example, to establish the second neuron memory, the NATU 465 is arranged to randomize the neural state of neurons copied from the first neuron memory. Thus, the same neurons are present in the copy, but the individual state values of these neurons may be randomized.

As noted above, the NATU 465 is arranged to assign a second NID to the second neuron memory and update the NATU information for the second NID to create a correspondence between the second NID and the synapse data. This may be implemented by creating a NATU table entry with the new (second) NID and the new PNID ranges for the cloned neurons. In an example, the NATU information includes a NID specific data structure with pointers into synapse memory for a given NID. Here, a first NID data structure for the NID and a second NID data structure for the second NID include pointers to synapse memory space that are the same. Thus, operations on the two NIDs will resolve to the same synapses.

Neural network cloning may increase hardware efficiency by enabling additional input processing for the equivalent neural network. Because spiking neural networks operate via a frequency and path of spikes, it is not trivial to simply speed up spikes in order to process additional data. However, cloning the network allows additional data to be processed in the same manner, at the same time, without changing the spiking behavior in either network. Because the spike behavior is generally sparse (e.g., happens infrequently and in different parts of a given network), there is often the capacity in the hardware to operate several cloned networks. Further, where synapse data is shared, there is no duplication of synapse memory space, enabling each of the cloned networks to have robust synapse connectivity without regard to the number of cloned networks operating simultaneously on the neuromorphic hardware.

In an example, the NATU 465 is arranged to update a synapse structure in the synapse data based on a training event corresponding to the first NID. Thus, the first NID network performs STDP and updates its synapse data accordingly. In an example, a neural network that corresponds to the second NID may be invoked (e.g., started, run, etc.) simultaneously with the neural network corresponding to the NID. Here, both the neural network corresponding to the second NID and the neural network corresponding to the NID use the synapse structure. Accordingly, in cloned networks that share synapse data, training enhancements to one cloned network, are immediately available to the other cloned networks. Moreover, training itself may be sped by processing more training data with a given time period, or providing the different cloned networks different aspects of the training data.

In an example, the NATU 465 is packaged with the AP 450 (as illustrated). However, the NATU 465 may be external to the AP 450, for example, placed in the MC 460, or between the AP 450 and the NPC 410. In an example, the AP 450 is part of a system that includes the NPC 410 connected via an interconnect. In an example, the system includes a power supply to provide to power components of the system. In an example, the power supply includes an interface to provide power via mains power or a battery.

FIG. 5 provides a further illustration of a system-level view 500 of the neuromorphic hardware configuration architecture (e.g., the architecture 310 discussed in FIG. 3). As shown, the architecture includes instances of the APs 450 (e.g., APs 450A, 450B, 450C, 450D) and NPCs 410 (e.g., NPCs 410A, 410B, 410C, 410D), generally corresponding to the instances of such APs and NPCs depicted in FIGS. 4A and 4B. In particular, the architecture in view 500 illustrates the interconnection of the NPCs and APs via a network 510.

For clarity, the neuromorphic architecture for multitasking described above is here reiterated. The Neuron Processors (NP) model a number of neurons, integrating incoming spike weight messages to change neuron membrane potential values. When a neuron's potential exceeds a threshold, it generates a spike event message, which is sent to an appropriate (e.g., predetermined, closest, available, etc.) Axon Processor (AP). According to the neuron identifier (ID) of the spike event message, the AP fetches the corresponding list of synapses from the External Memory (EM) via its memory controller (MC). The AP then sends spike weight messages to the NPs of all of the target neurons in the synapse list, which causes those neurons' potentials to change, continuing the cycle.

In the context of a single SNN operating on the neuromorphic hardware (no virtualization or multitasking), there is only one set of neurons that operate from the NPs, and one set of synapse lists that are stored in the EMs. When a neuron spikes, its neuron ID (Ns), which is sent to the AP as part of a spike event message, is totally unambiguous as to which synapse list should be fetched from the EM and processed. Furthermore, when a synapse identifies a target of a spike weight message (Nt), there is no ambiguity as to which neuron in the NPs should be sent the message.

However, when there is a plurality of SNNs being processed by the neuromorphic hardware, there is ambiguity in both Ns and Nt. When the AP receives a spike event message, the AP must distinguish which Ns spiked to fetch the correct synapse list. Further, when the AP is processing the synapse list, the AP must distinguish which Nt to send the spike weight message. To address this issue, Ns and Nt are recast as LNIDs and the AP (e.g., via a NATU) translates between LNID and PNID addresses to isolate individual SNNs that are simultaneously operating on the neuromorphic hardware.

Once these translation and isolation components are in place, the processing elements (e.g., NPs and APs) are free to process whatever work items they receive, according to a scheduling algorithm (e.g., first-come-first-served). In traditional central processing units (CPUs), simultaneous multithreading (SMT) operates by interleaving instruction execution, which may analogous to the previously mentioned work items, to increase CPU resource utilization rates. In the context of this SNN accelerator, the granularity of the interleaved work items may be different based on the types of processing elements in the system (e.g., NP vs. AP).

In an example, for the NPs, a work item may be either updating an individual neuron's membrane potential when it receives a spike weight message, or the work item may be the entire operation of advancing to the next time step by looking for new spikes and leaking all of its neurons' membrane potentials within the SNN. In an example, for APs, a work item may be the whole process of fetching a synapse list from memory, processing it, and sending out all spike weight messages to the target NPs, or the work item may be sending out an individual spike weight message. These work items may each span a significant time period, but there may also be long idle periods between these work items from a single SNN, or within a given work item (e.g., waiting to fetch a synapse list from memory may leave the AP or NP idle). Accordingly, it is valuable to have work items ready to go from a plurality of SNNs to reduce NP or AP idleness and thus increase resource utilization.

Figure 6A:
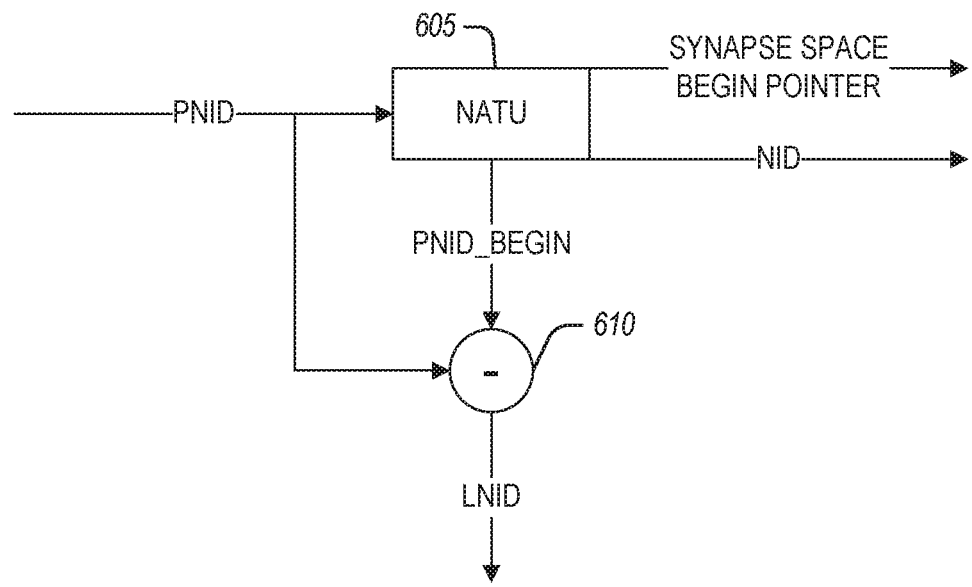
FIGS. 6A and 6B illustrate a network address translation unit (NATU) to implement an aspect of neuromorphic accelerator multitasking, according to an embodiment.
Figure 6B:
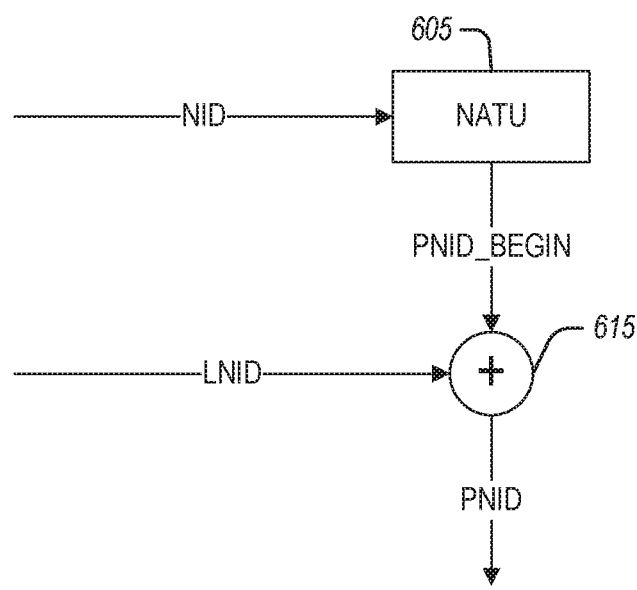

FIGS. 6A and 6B illustrate a NATU 605 to implement an aspect of neuromorphic accelerator multitasking, according to an embodiment. FIG. 6A illustrates a translation flow from NP to AP (e.g., an out-bound spike message) and FIG. 6B illustrates a translation flow from AP to NP (e.g., an in-bound spike message). For the out-bound spike message flow, the NATU 605 receives the PNID and is arranged to calculate the LNID, the NID, and the synapse data from the PNID. As illustrated, the NATU 605 may ascertain the NID by comparing the PNID to PNID ranges assigned to each NID in a table. This table may also include the synapse space for the NID. The LNID may be calculated by subtracting (e.g., via a subtractor 610 or an adder operating on signed data) the PNID_begin value, corresponding to the NID. Thus, here, the LNID is an offset of the PNID into a PNID range for a corresponding neural network identified by the NID.

Once the synapse data and the LNID are calculated, the AP may operate as if there is only one SNN on the neuromorphic hardware (described above). For the in-bound flow, the NATU 605 calculates the PNID from the NID and the LNID. For example, the NATU 605 may receive the NID from the AP (or calculate the NID based on a synapse memory address that corresponds to the NID) and retrieve the PNID_begin address that corresponds to the NID from the NATU information. The PNID_begin address may then be added to the LNID via the adder 615 to produce the PNID. The PNID may then be used by the AP to address the spike message for a target neuron. The NP may then operate on the PNIDs without regard to which SNN of several the PNID belongs.

Thus, when a new neural network is created and its neuron and synapse memory space is allocated, pointers (e.g., addresses) of the neuron memory space are recorded (e.g., by a memory management unit (MMU) or other component of the AP) in the NATU to the beginning and the end of the allocated physical neuron space. The same thing may be done for pointers to the beginning and end of the allocated synapse memory space. The NATU may also store the NID for the new network. This information—which may be in one structure (e.g., a single table) or several structures (e.g., register files)—is sufficient to translate a spiking neuron's PNID into a synapse list address, and then translate the target LNID from the synapse list back into a target PNID. In an example, the NATU 605 is located in an AP to translate between LNID and PNID when accessing to synapse memory. In an example, the NATU 605 is located in a NP to perform translations. However, AP colocation of the NATU 605 may lead to fewer NATUs in the system because there are generally fewer APs than NPs.

When a spike event message arrives at the AP, part of the message is the PNID of the spiking neuron. The AP checks the NATU 605 to determine which network this PNID belongs to, and therefore where its synapse list resides in the synapse memory space. To this end, range comparisons may be performed to find the NATU entry where the PNID of the spike is within the beginning and end PNID of the network entry. When the match is found, corresponding synapse space is determined based on the synapse space beginning and end pointers. Within this space, synapse lists may be accessed regularly as if this was the only network running.

In an example, the synapse lists contain LNIDs, and not PNIDs. Therefore, when spike messages are being prepared to be delivered from AP to NPCs, the NATU translates these LNIDs to PNIDs. This translation may take the form of a simple addition, adding the beginning of the network's PNID range to the LNID of the target neuron. Translating PNID to LNID operates in the reverse, as described above.

FIG. 7 illustrates a NATU table and synapse memory space arrangements for local network to physical network translations, according to an embodiment. Neuron memory space is represented by a PNID (e.g., a global neuron ID). Each PNID corresponds to a unique physical location in the NSM located in the Neuron Processor Clusters NPCs. As described above, the PNID may be translated into a NID and a LNID, and back again into a unique PNID. NPCs may operate directly on PNIDs, which simplifies their design. The use of PNIDs, LNIDs, and NIDs provides isolation for neurons from different networks. For example, two different networks may have neurons with same LNID, but they will map to separate, unique PNIDs.

Translation within both neuron and synapse memory spaces 710 may occur via segmentation. When a new network is created, an MMU, for example, allocates a contiguous region within the neuron memory space for all of that network's neurons (e.g., neuron state data). On the synapse side, the MMU allocates a contiguous region in the external memory for synapse storage. Hence, each network gets a separate contiguous chunk of memory space for their synapse lists. The size of this space is determined by the number of neurons and synapses in the network.

Neuron targets in the synapse lists are stored in terms of LNID. Thus, each network only has connections within itself (e.g., only intra-network connections), and doesn't have any knowledge of (e.g., ability to address) global neuron IDs, or PNIDs. Translation between local IDs (LNID) and global IDs (PNID) may be accomplished by the NATU with a translation table 705.

The translation table 705 includes five fields for each record, where each record corresponds to one neural network. The fields, organized as columns in the table 704, include a begin and an end value for each of PNIDs and synapse address space, and a NID record. Because the PNID and synapse memory are designated via ranges, the allocation of these resources is contiguous. However, additional data fields may be used to provide a more flexible allocation technique, such as a linked list of contiguous regions allocated to a single NID record. For continuous allocation, the synapse memory space 710 is arranged such that the network synapse spaces abut each other in the synapse memory space 710, as illustrated.

This translation technique enables simultaneous multi-tasking via translation to ensure isolation between concurrent neural networks. For example, each NPC and AP may implement a work queue of items to be processed. At the AP, the work queue contains the PNIDs of neurons that spiked, and will be processed in subsequent time steps. At the NPC, the work queue contains PNIDs plus weights to add to target neurons. In an example, no translation is required at the NPC, because the translation and isolation are handled by the AP. Any suitable work queue scheduling algorithm may be used for the AP and NPC work queues, such as first-come-first-serve, or some QoS-based or user-defined scheme. This way it may prioritize spike processing (NPC), spike deliveries (AP), or synapse list fetch (AP) for certain networks.

When an SNN has completed processing of all spikes for the current time step, some operations will complete before the next time step begins. For example, neurons belonging to that SNN are checked for new spikes (e.g., generating new spike event messages that are sent to the APs), and then have part of their membrane potential leaked if modeling leaky neurons. The APs may then "wake up" the pending, in-flight spikes that will be processed in the next time step belonging to that SNN. In both cases, the neurons and in-flight spikes of other SNNs that are not advancing their time step at the same time are not disturbed.

Inside each NPC, the neurons within the range of PNIDs (between PNID_begin and PNID_end inclusive) corresponding to the advancing SNN (e.g., network corresponding to NID A) are fetched, checked, leaked, and new spike event messages are sent to the APs. After the NPCs have completed this operation for the advancing SNN, then the APs may be notified to begin processing that SNN's in-flight spikes again, and the time step advances. In this manner, the NATU information 705 enables the neuromorphic hardware, via the NATU, to multitask neural networks in a previously unobtainable manner.

Figure 8A:
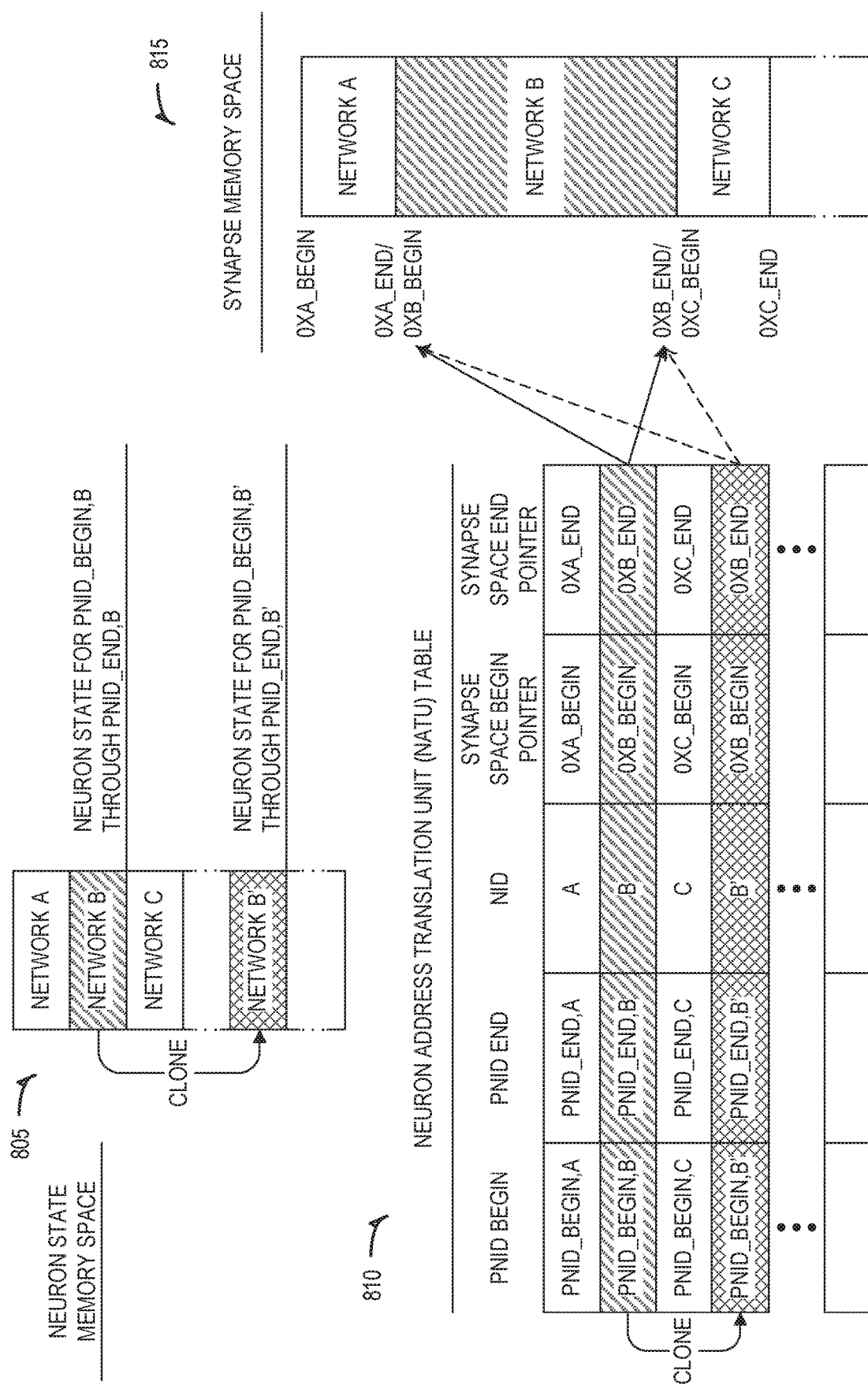
FIGS. 8A-8C illustrate a NATU table, neuron memory space, synapse memory space, and methods for neural network cloning, according to an embodiment.
Figure 8B:
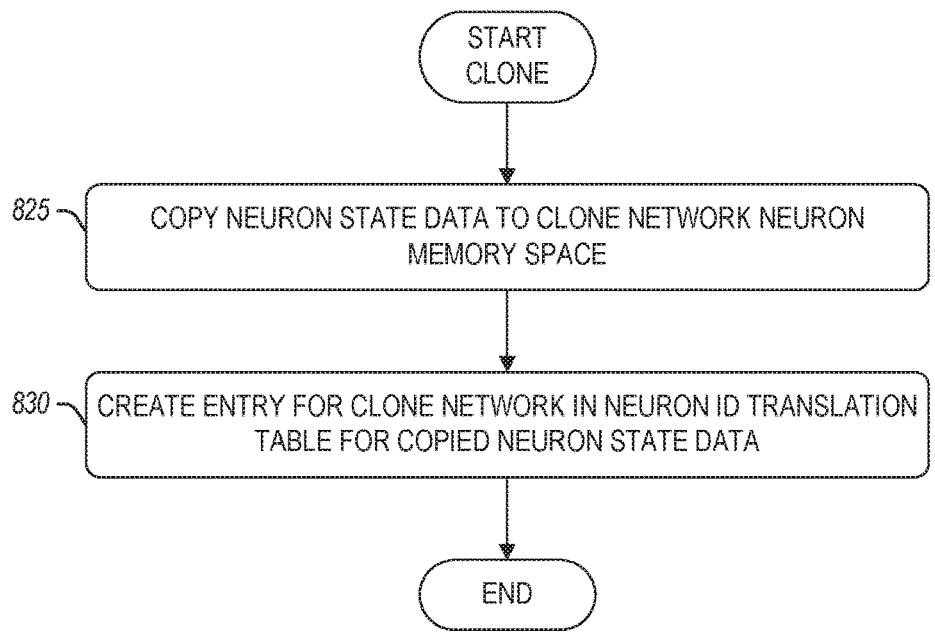
Figure 8C:
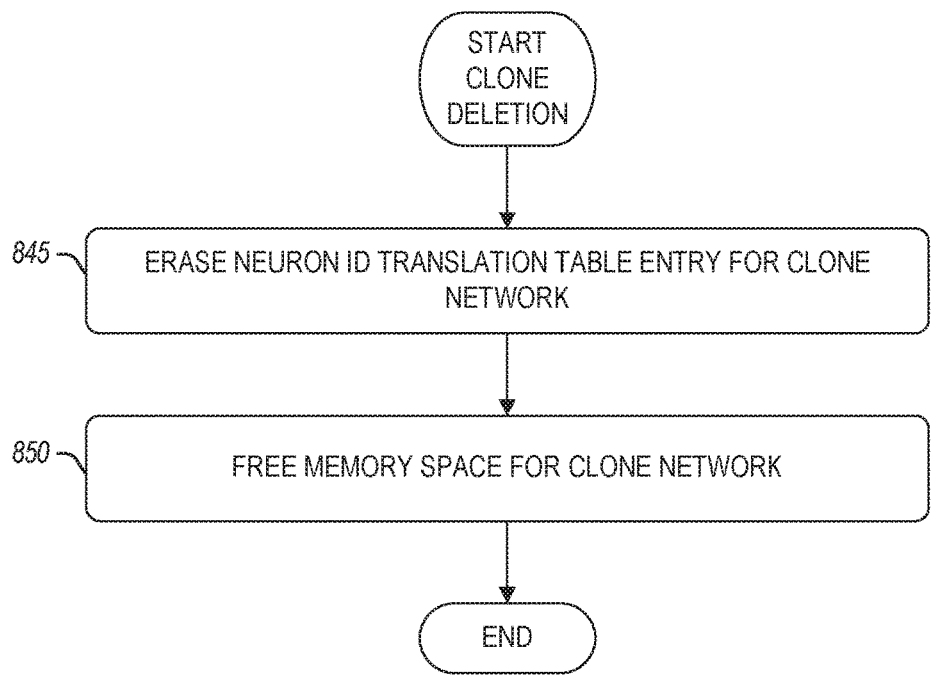

FIGS. 8A-8C illustrate a NATU table 810, neuron memory space 805, synapse memory space 815, and methods 820 and 840 for neural network cloning, according to an embodiment. The data structures illustrated provide an example use of neural network multitasking in which neural networks are cloned and run concurrently on the neuromorphic hardware.

In the NATU table 810, each SNN, with its unique NID, has pointers to the beginning and end of its neuron space region 805 (in the form of PNID begin and end entries), and pointers to the beginning and end of its synapse space region 815. The neurons of a network are stored inside the NPs, in NSMs, which are in turn are inside NPCs. To create a clone of a network, neuron data in the NSMs is duplicated (operation 825 of the method 820), and NATU information (e.g., NATU table 810) is updated in the NATUs in the APs (operation 830 of the method 820). The result is a clone (e.g., cloned network, cloned SNN, cloned neurons, neuron clone, etc.). In an example, synapse data is not duplicated but, as illustrated between NID entries B and B', the synapse pointers are the same.

In an example, dedicated hardware within an NSM, an AP, or elsewhere, may perform the neuron state duplication. In an example, this hardware copies all of the neuron state within a range between two pointers to another place within the NSM, as illustrated in the neuron state memory space 805 where the neuron state of NID B is copied to create the neuron stat of NID B' (operation 825 of the method 820. In an example, the copying may be carried out via instructions on a general purpose processing unit that has access to read neuron state from one region of the NSM and write a copy of that neuron state to another region of the NSM. In an example, the hardware may operate via low-level commands, such as "copy this range of addresses to this other range of addresses," or it may operate via high level commands, such as "create a clone of network B." In general, the duplication takes a snapshot of the current state of the NSM corresponding to a neural network, whatever that state happens to be. However, in an example, it may be advantageous to "reset" the new copy to a more neutral, random state, similar to how neural networks are often initialized.

On the AP side, creating a cloned network includes creation of a new entry in the NATU table 810 (operation 830 of the method 820). The new entry's PNIDs point to the locations of the newly duplicated neurons in the neuron state memory space 805. However, the synapse space pointers point to the same locations in the synapse memory space 815 as the original network. This is illustrated in FIG. 8 via the solid and dashed arrows from the synapse space pointers in the NATU table 810 for NIDS B and B'.

The newly created cloned network is a completely independent network, separate from the original, because its neurons are isolated via the PNID multitasking technique described above. All of the cloned network's neurons may integrate membrane potential and generate spikes independent of the activity of the original network. The NATU ensures that spikes weight messages that are generated by the cloned network may only target neurons that are also within that cloned network. Thus, two networks are "spatially parallel," meaning on-chip storage (e.g., the additional neuron state) is used to increase the parallelism and throughput.

During operation, when either the original network or the cloned network generate spikes, the AP fetches the same set of synapse lists from the synapse memory space 815, based on the NATU table 810, to process those spikes. Each network may concurrently access or update (e.g., via a learning mle or hardware) the synapse data. In general, synapse data race conditions are inconsequential because of the noise and error resistance inherent in SNNs.

After the cloned network has completed the task it was created for, it may be destroyed by deallocating its neurons in the NSM (e.g., the neuron state memory space 805) (operation 845 from the method 840), and by deleting its entry in the NATU table 810 (operation 850 from the method 840). The synapse state is not modified by creating or destroying a cloned network.

Network cloning and neural network multitasking is useful in various use cases. For example, the concept of batched learning is widely employed in deep neural networks. Here, multiple input sets (e.g., training sets) are bundled as batches, where synapse weight changes are calculated within for each batch. The cumulative weight updates (e.g., changes) may then be applied all at once. Network cloning may perform batched learning in a spatial manner. Thus, each cloned network may simultaneously operate on a different input set while applying its changes to the shared set of synapses. An advantage of this approach is the simultaneous processing of multiple inputs. Inference and training may also be improved by reducing idle periods in the hardware. For spiking neural networks, it is a common practice to "rest" the network after processing an input, which creates idle periods where no training or inference results are produced. Using multiple cloned networks enables multiple entry points to the same set of synapses. Therefore, the "resting" period for one Neuron Clone may be overlapped with training or inference on some other input using another cloned network which shares the exact same synapses.

Figure 9:
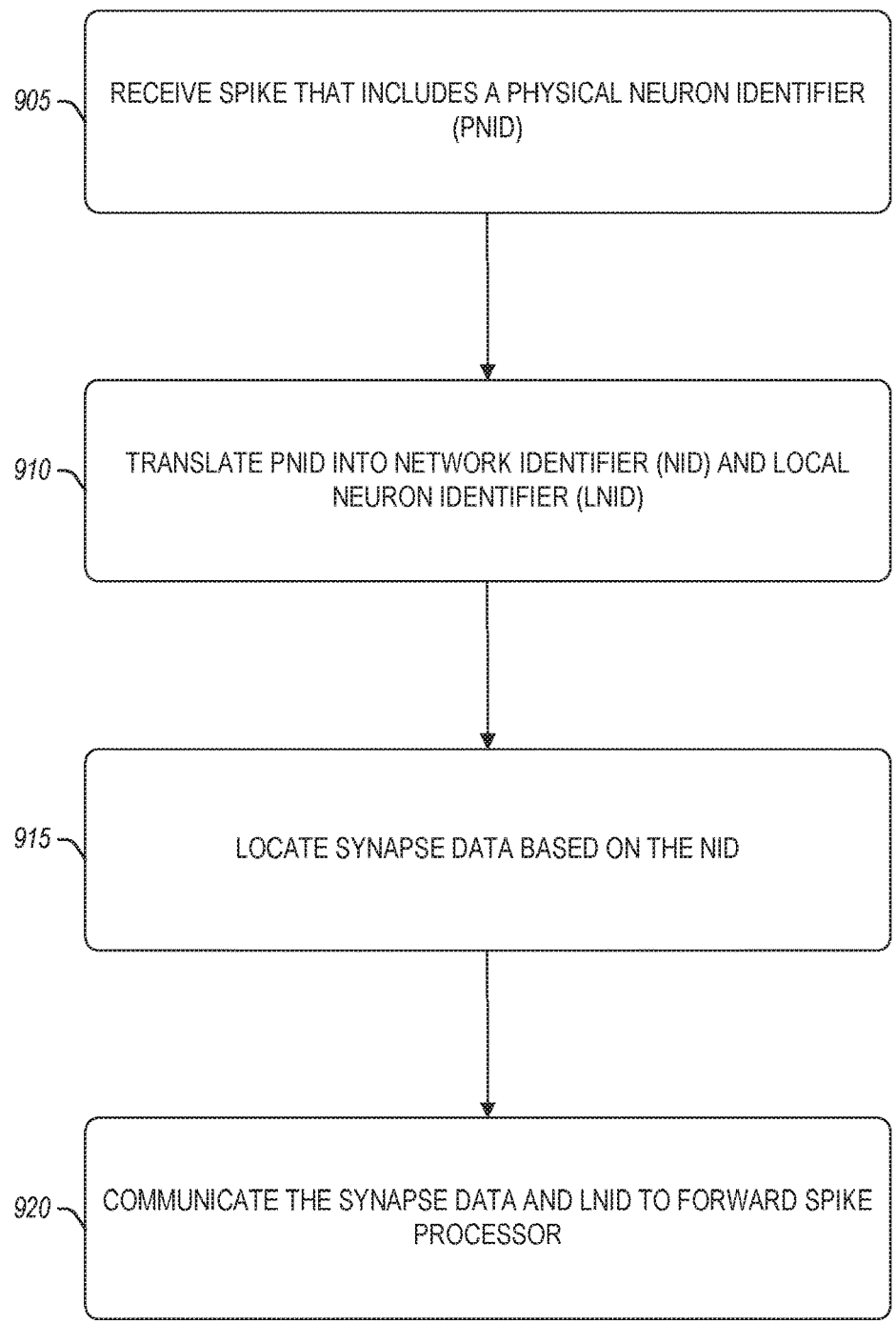
FIG. 9 illustrates a flow chart of an example of a method for neuromorphic hardware multitasking, according to an embodiment.

FIG. 9 illustrates a flow chart of an example of a method 900 for neuromorphic hardware multitasking, according to an embodiment. The operations of the method 900 are implemented in electronic hardware, such as that described above with respect to FIGS. 2-5), or below (e.g., processing circuitry).

At operation 905, a spike message is received. Here, the spike message includes a physical neuron identifier (PNID) of a neuron causing the spike.

At operation 910, the PNID is translated into a network identifier (NID) and a local neuron identifier (LNID). In an example, the LNID is calculated by subtracting a PNID_begin value from the PNID. Here a member of the set of PNID ranges includes a PNID_begin and PNID_end pair that respectively hold a smallest PNID and a largest PNID that correspond to a NID. In an example, translating the PNID into the NID and the LNID includes removing a number of bits corresponding to a NID length from an end of the PNID. In an example, translating the PNID into the NID and the LNID includes comparing the PNID to a set of PNID ranges. Here, each PNID range corresponds to a unique NID.

At operation 915, synapse data is located based on the NID. In an example, the synapse data includes a memory address range.

At operation 920, the synapse data and the LNID are communicated an axon processor.

In an example, the operations of the method 900 are performed by a NATU. In an example, the NATU is packaged with the axon processor. In an example, the axon processor is part of a system that includes neural processor clusters connected via an interconnect to the axon processor. In an example, the system includes a power supply to provide to power components of the system. In an example, the power supply includes an interface to provide power via mains power or a battery.

The operations of the method 900 may also include determining that a second spike message is addressed to the LNID based on a synapse structure located from the synapse data. The operations of the method 900 may also include translating the LNID into the PNID using the NID corresponding to the synapse data. In an example, the PNID is calculated by adding a PNID_begin value—that corresponding to a PNID range of the NID—to the LNID. In an example, translating the LNID into the PNID includes concatenating the NID onto an end of the LNID. The operations of the method 900 may also include communicating the second spike message to the axon processor using the PNID to identify the neuron.

The operations of the method 900 may also include receiving a neural network clone indication that includes the NID and establishing a second neuron memory, equivalent to a first neuron memory corresponding to the NID, to a second region of a memory that contains neuron memory. In an example, establishing the second neuron memory includes copying the first neuron memory. In an example, establishing the second neuron memory includes randomizing neural state of neurons copied from the first neuron memory.

The operations of the method 900 may also include assigning a second NID to the second neuron memory and updating NATU information for the second NID to create a correspondence between the second NID and the synapse data. In an example, the NATU information includes a NID specific data structure with pointers into synapse memory for a given NID. Here, a first NID data structure for the NID and a second NID data structure for the second NID include pointers to synapse memory space that are the same.

The operations of the method 900 may also include updating a synapse structure in the synapse data based on a training event corresponding to the first NID. In an example, a neural network that corresponds to the second NID may be invoked (e.g., started, run, etc.) simultaneously with the neural network corresponding to the NID. Here, both the neural network corresponding to the second NID and the neural network corresponding to the NID use the synapse structure.

Figure 10:
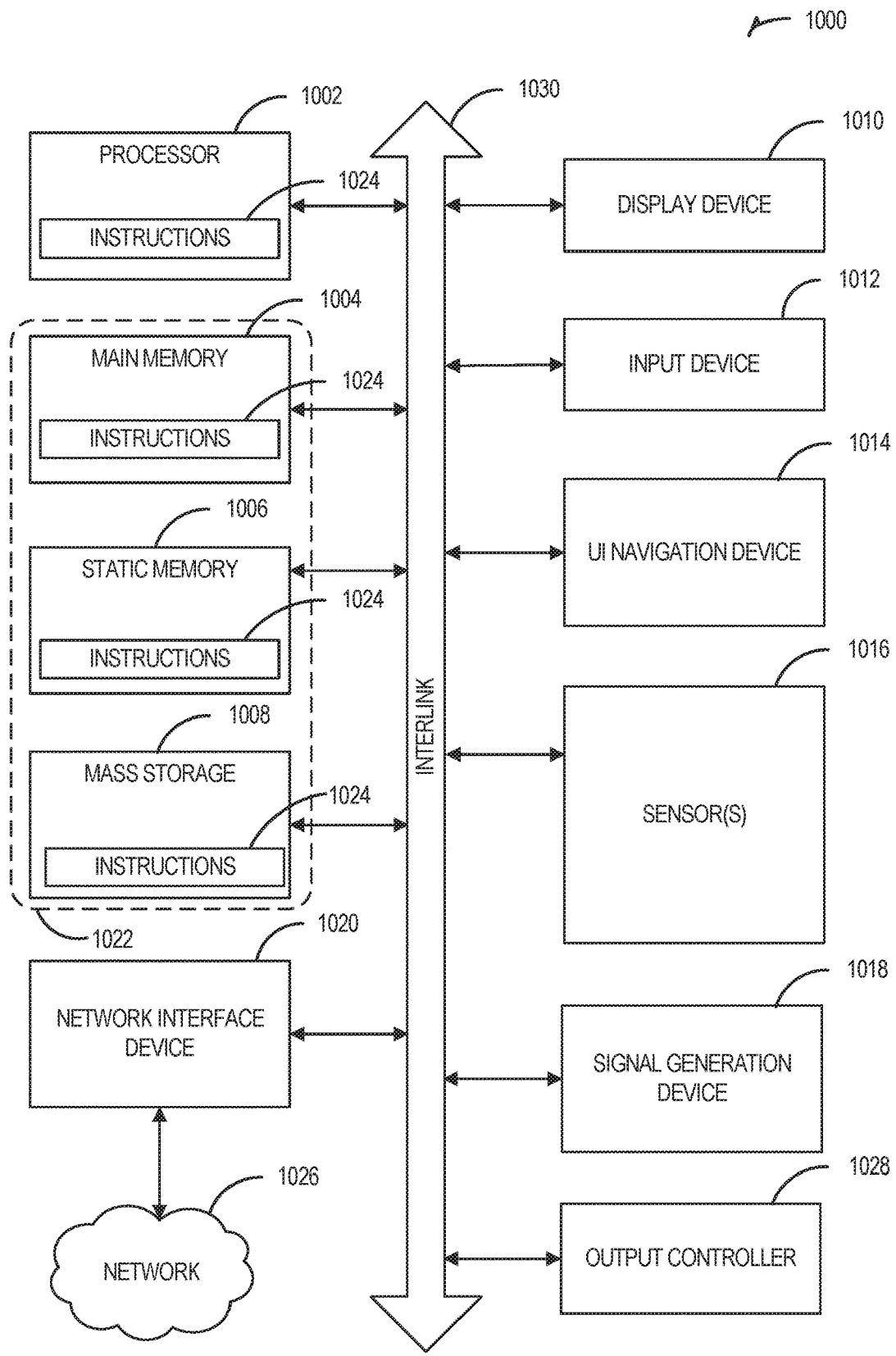
FIG. 10 is a block diagram illustrating an example of a machine upon which one or more embodiments may be implemented.

FIG. 10 illustrates a block diagram of an example machine 1000 upon which any one or more of the techniques (e.g., methodologies) discussed herein may perform. Examples, as described herein, may include, or may operate by, logic or a number of components, or mechanisms in the machine 1000. Circuitry (e.g., processing circuitry) is a collection of circuits implemented in tangible entities of the machine 1000 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1000 follow.

In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1000 may include a hardware processor 1002 (e.g., a central processing unit (CPU), a graphics processing unit (GPU), a hardware processor core, neuromorphic accelerator, or any combination thereof), a main memory 1004, a static memory (e.g., memory or storage for firmware, microcode, a basic-input-output (BIOS), unified extensible firmware interface (UEFI), etc.) 1006, and mass storage 1008 (e.g., hard drive, tape drive, flash storage, or other block devices) some or all of which may communicate with each other via an interlink (e.g., bus) 1030. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1008, a signal generation device 1018 (e.g., a speaker), a network interface device 1020, and one or more sensors 1016, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1002, the main memory 1004, the static memory 1006, or the mass storage 1008 may be, or include, a machine readable medium 1022 on which is stored one or more sets of data structures or instructions 1024 (e.g., software) embodying or utilized by any one or more of the techniques or functions described herein. The instructions 1024 may also reside, completely or at least partially, within any of registers of the processor 1002, the main memory 1004, the static memory 1006, or the mass storage 1008 during execution thereof by the machine 1000. In an example, one or any combination of the hardware processor 1002, the main memory 1004, the static memory 1006, or the mass storage 1008 may constitute the machine readable media 1022. While the machine readable medium 1022 is illustrated as a single medium, the term "machine readable medium" may include a single medium or multiple media (e.g., a centralized or distributed database, or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may be further transmitted or received over a communications network 1026 using a transmission medium via the network interface device 1020 utilizing any one of a number of transfer protocols (e.g., frame relay, interne protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software. A transmission medium is a machine readable medium.

FIGS. 11 through 20 illustrate several additional examples of hardware structures or implementations that may be used to implement computer hardware.

Figure 11:
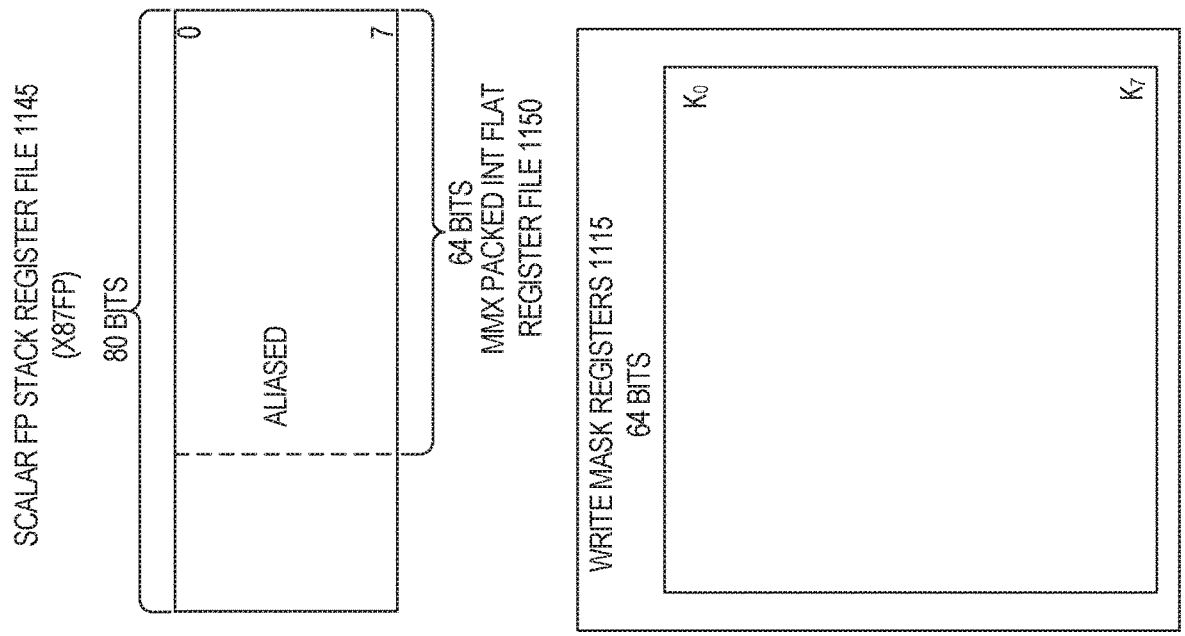
FIG. 11 is a block diagram of a register architecture according to an embodiment.
Figure 11:
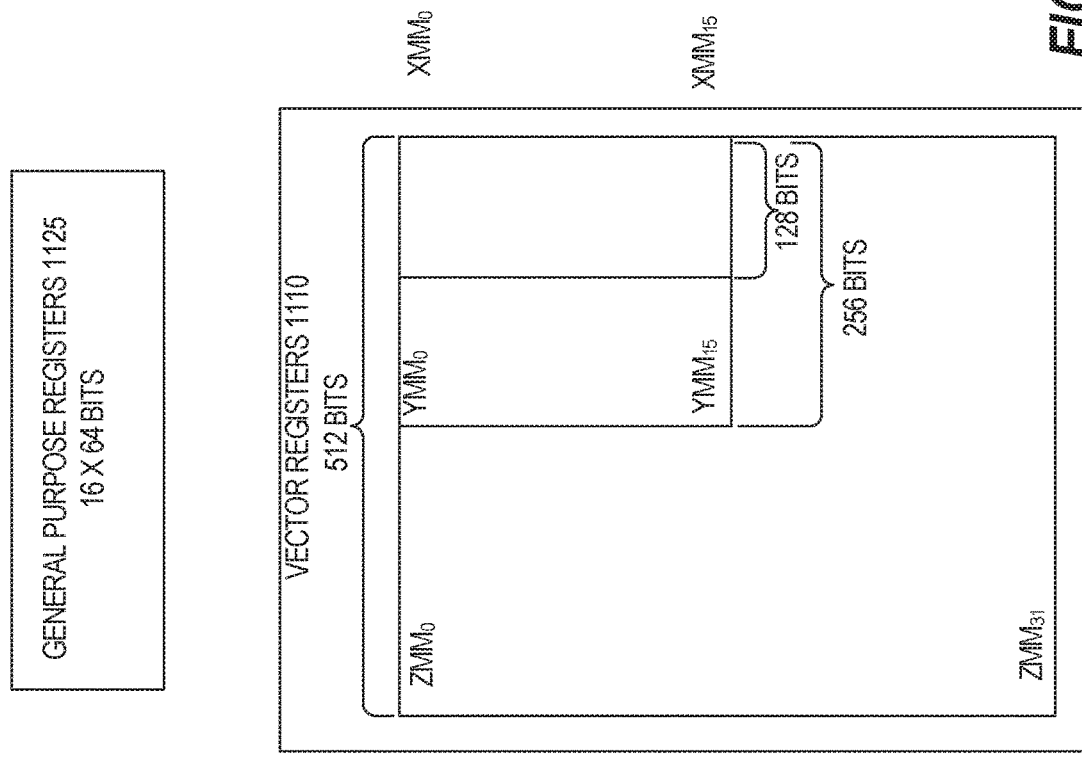

FIG. 11 is a block diagram of a register architecture 1100 according to an embodiment. In the embodiment illustrated, there are 32 vector registers 1110 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

Write mask registers 1115—in the embodiment illustrated, there are 8 write mask registers (k0 through k7), each 64 bits in size. In an alternate embodiment, the write mask registers 1115 are 16 bits in size. As previously described, in an embodiment, the vector mask register k0 cannot be used as a write mask; when the encoding that would normally indicate k0 is used for a write mask, it selects a hardwired write mask of 0xFFFF, effectively disabling write masking for that instruction.

General-purpose registers 1125—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1145, on which is aliased the MMX packed integer flat register file 1150—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers. Alternative embodiments may use wider or narrower registers. Additionally, alternative embodiments may use more, less, or different register files and registers.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processons the above described coprocessor, and additional functionality. Example core architectures are described next, followed by descriptions of example processors and computer architectures.

Figure 12:
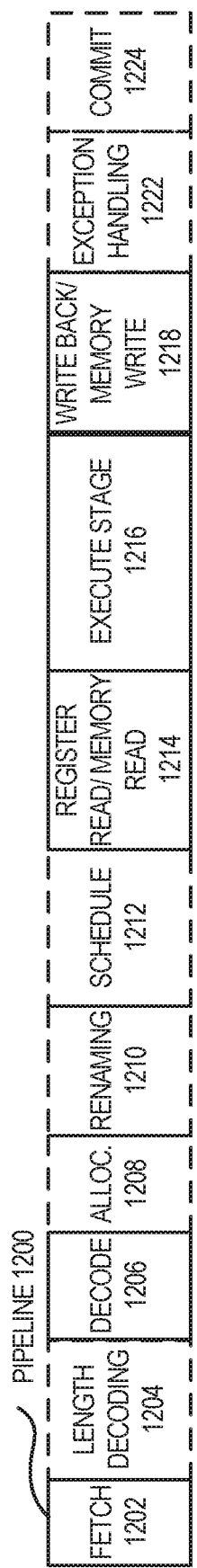
FIG. 12 is a block diagram illustrating both an example in-order pipeline and an example register renaming, out-of-order issue/execution pipeline according to various embodiments.

FIG. 12 is a block diagram illustrating both an example in-order pipeline and an example register renaming, out-of-order issue/execution pipeline according to various embodiments. The solid lined boxes in FIG. 12 illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 12, a processor pipeline 1200 includes a fetch stage 1202, a length decode stage 1204, a decode stage 1206, an allocation stage 1208, a renaming stage 1210, a scheduling (also known as a dispatch or issue) stage 1212, a register read/memory read stage 1214, an execute stage 1216, a write back/memory write stage 1218, an exception handling stage 1222, and a commit stage 1224.

Figure 13:
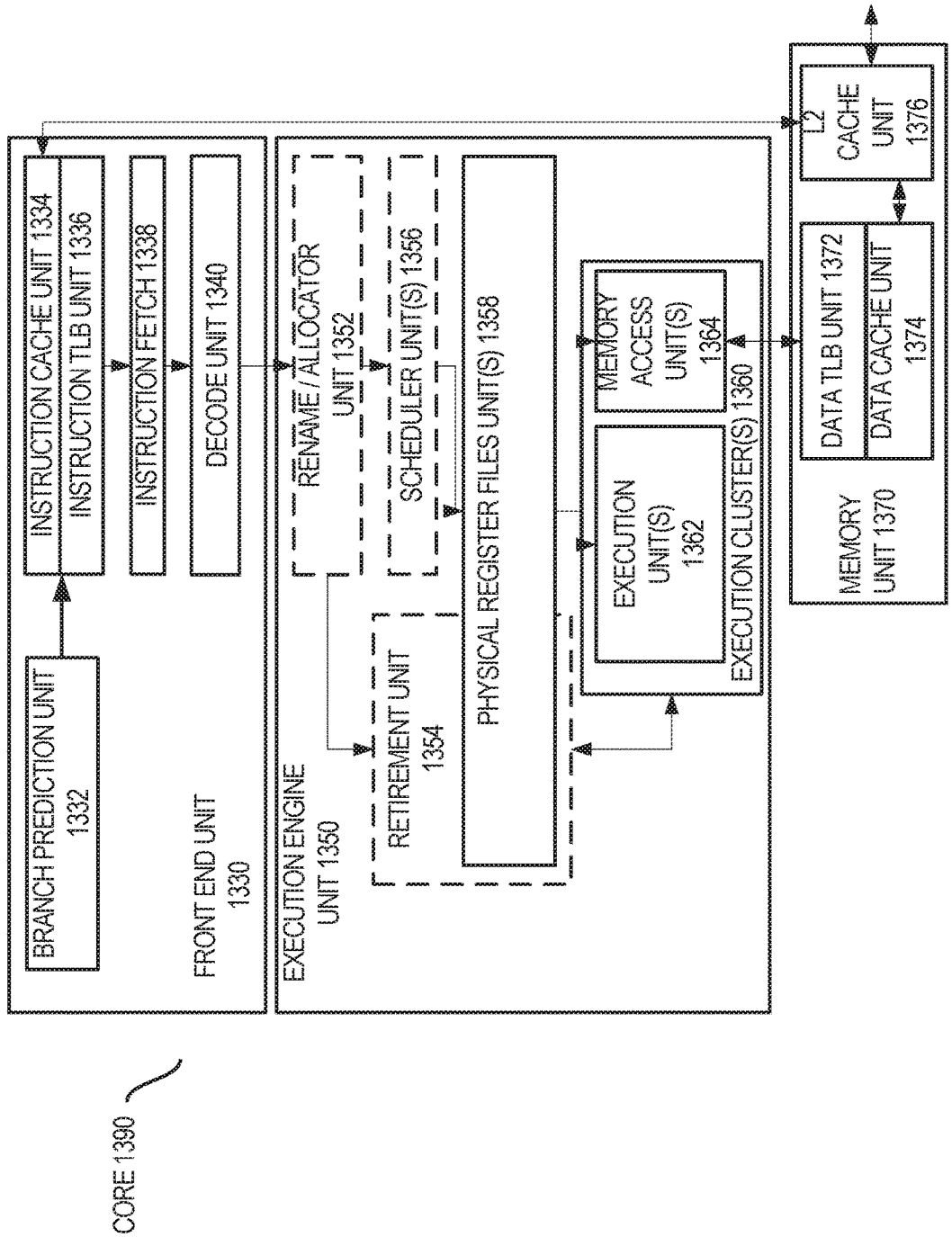
FIG. 13 is a block diagram illustrating both an example embodiment of an in-order architecture core and an example register enaming, out-of-order issue/execution architecture core to be included in a processor according to various embodiments.

FIG. 13 shows processor core 1390 including a front end unit 1330 coupled to an execution engine unit 1350, and both are coupled to a memory unit 1370. The core 1390 may be a reduced instruction set computing (RISC) core, a complex instruction set computing (CISC) core, a very long instruction word (VLIW) core, or a hybrid or alternative type. As yet another option, the core 1390 may be a special-purpose core, such as, for example, a network or communication core, compression engine, coprocessor core, general purpose computing graphics processing unit (GPGPU) core, graphics core, or the like.

The front end unit 1330 includes a branch prediction unit 1332 coupled to an instruction cache unit 1334, which is coupled to an instruction translation lookaside buffer (TLB) 1336, which is coupled to an instruction fetch unit 1338, which is coupled to a decode unit 1340. The decode unit 1340 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1390 includes a microcode ROM or other medium that stores microcode for certain macroinstructions (e.g., in decode unit 1340 or otherwise within the front end unit 1330). The decode unit 1340 is coupled to a rename/allocator unit 1352 in the execution engine unit 1350.

The execution engine unit 1350 includes the rename/allocator unit 1352 coupled to a retirement unit 1354 and a set of one or more scheduler unit(s) 1356. The scheduler unit(s) 1356 represents any number of different schedulers, including reservations stations, central instruction window, etc. The scheduler unit(s) 1356 is coupled to the physical register file(s) unit(s) 1358. Each of the physical register file(s) units 1358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1358 comprises a vector registers unit, a write mask registers unit, and a scalar registers unit. These register units may provide architectural vector registers, vector mask registers, and general purpose registers. The physical register file(s) unit(s) 1358 is overlapped by the retirement unit 1354 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1354 and the physical register file(s) unit(s) 1358 are coupled to the execution cluster(s) 1360. The execution cluster(s) 1360 includes a set of one or more execution units 1362 and a set of one or more memory access units 1364. The execution units 1362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1356, physical register file(s) unit(s) 1358, and execution cluster(s) 1360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register filers) unit, and/or execution cluster—and in the case of a separate memory access pipeline, certain embodiments are implemented in which only the execution cluster of this pipeline has the memory access unit(s) 1364). It should also be understood that where separate pipelines are used, one or more of these pipelines may be out-of-order issue/execution and the rest in-order.

The set of memory access units 1364 is coupled to the memory unit 1370, which includes a data TLB unit 1372 coupled to a data cache unit 1374 coupled to a level 2 (L2) cache unit 1376. In one example, the memory access units 1364 may include a load unit, a store address unit, and a store data unit, each of which is coupled to the data TLB unit 1372 in the memory unit 1370. The instruction cache unit 1334 is further coupled to a level 2 (L2) cache unit 1376 in the memory unit 1370. The L2 cache unit 1376 is coupled to one or more other levels of cache and eventually to a main memory.

By way of example, the example register renaming, out-of-order issue/execution core architecture may implement the pipeline 1200 as thllows: 1) the instruction fetch 1338 performs the fetch and length decoding stages 1202 and 1204; 2) the decode unit 1340 performs the decode stage 1206; 3) the rename/allocator unit 1352 performs the allocation stage 1208 and renaming stage 1210; 4) the scheduler unit(s) 1356 performs the schedule stage 1212; 5) the physical register file(s) unit(s) 1358 and the memory unit 1370 perform the register read/memory read stage 1214; the execution cluster 1360 perform the execute stage 1216; 6) the memory unit 1370 and the physical register file(s) unit(s) 1358 perform the write back/memory write stage 1218; 7) various units may be involved in the exception handling stage 1222; and 8) the retirement unit 1354 and the physical register file(s) unit(s) 1358 perform the commit stage 1224.

The core 1390 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1334/1374 and a shared L2 cache unit 1376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 14B:
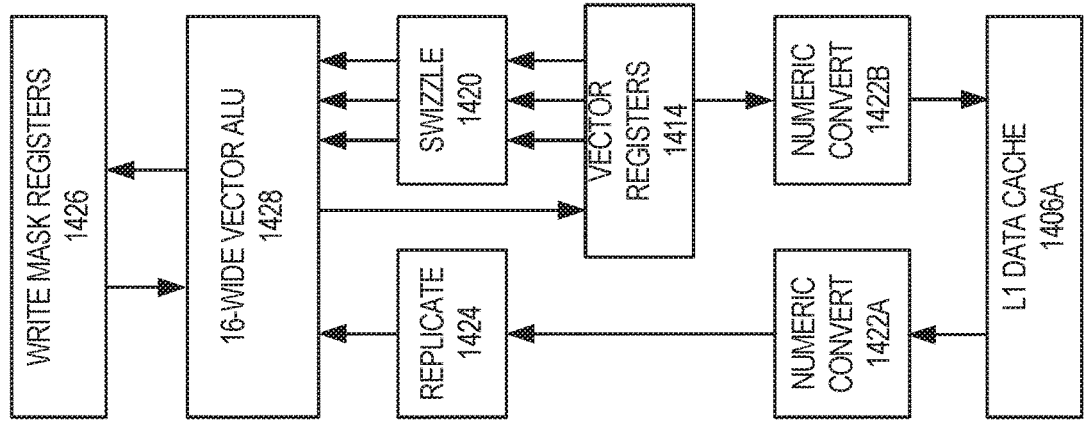
FIGS. 14A-14B illustrate a block diagram of a more specific example in-order core architecture, which core would be one of several logic blocks (including other cores of the same type and/or different types) in a chip.
Figure 14A:
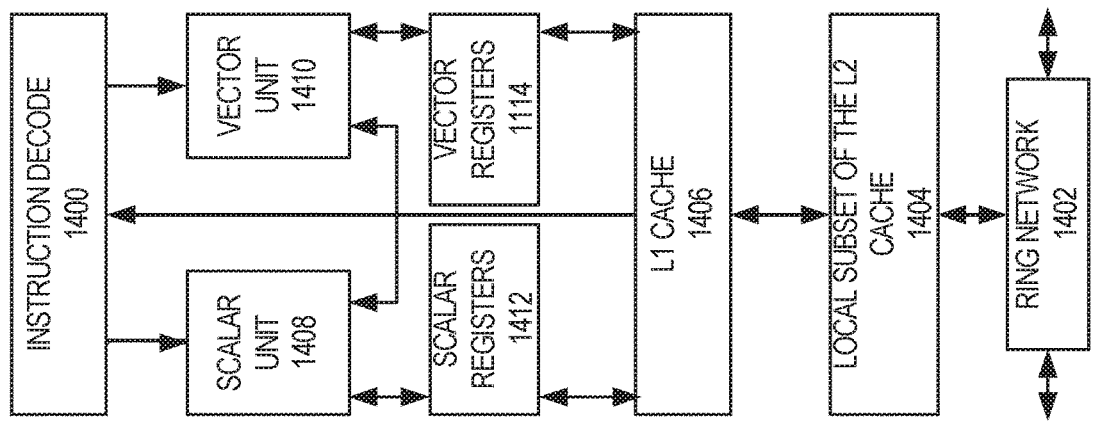

FIGS. 14A-14B illustrate a block diagram of a more specific example in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 14A is a block diagram of a single processor core, along with its connection to the on-die interconnect network 1402 and with its local subset of the Level 2 (L2) cache 1404, according to various embodiments. In one embodiment, an instruction decoder 1400 supports the x86 instruction set with a packed data instruction set extension. An L1 cache 1406 allows low-latency accesses to cache memory into the scalar and vector units. While in one embodiment (to simplify the design), a scalar unit 1408 and a vector unit 1410 use separate register sets (respectively, scalar registers 1412 and vector registers 1414) and data transferred between them is written to memory and then read back in from a level 1 (L1) cache 1406, alternative embodiments may use a different approach (e.g., use a single register set or include a communication path that allow data to be transferred between the two register files without being written and read back).

The local subset of the L2 cache 1404 is part of a global L2 cache that is divided into separate local subsets, one per processor core. Each processor core has a direct access path to its own local subset of the L2 cache 1404. Data read by a processor core is stored in its L2 cache subset 1404 and may be accessed quickly, in parallel with other processor cores accessing their own local L2 cache subsets. Data written by a processor core is stored in its own L2 cache subset 1404 and is flushed from other subsets, if necessary. The ring network ensures coherency for shared data. The ring network is hi-directional to allow agents such as processor cores, L2 caches and other logic blocks to communicate with each other within the chip. Each ring data-path is 1312-bits wide per direction.

FIG. 14B is an expanded view of part of the processor core in FIG. 14A according to embodiments. FIG. 14B includes an L1 data cache 1406A part of the L1 cache 1404, as well as more detail regarding the vector unit 1410 and the vector registers 1414. Specifically, the vector unit 1410 is a 16-wide vector processing unit (VPU) (see the 16-wide ALU 1428), which executes one or more of integer, single-precision float, and double-precision float instructions. The VPU supports swizzling the register inputs with swizzle unit 1420, numeric conversion with numeric convert units 1422A-B, and replication with replication unit 1424 on the memory input. Write mask registers 1426 allow predicating resulting vector writes.

Figure 15:
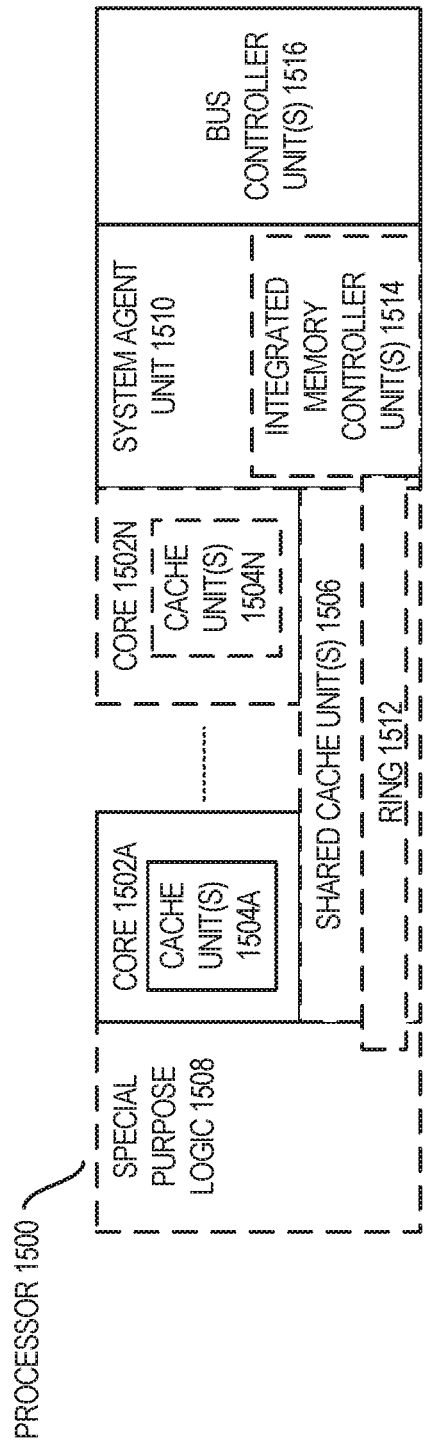
FIG. 15 is a block diagram of a processor that may have more than one core, may have an integrated memory controller, and may have integrated graphics according to various embodiments.

FIG. 15 is a block diagram of a processor 1500 that may have more than one core, may have tegrated memory controller, and may have integrated graphics according to embodiments. The solid lined boxes in FIG. 15 illustrate a processor 1500 with a single core 1502A, a system agent 1510, a set of one or more bus controller units 1516, while the optional addition of the dashed lined boxes illustrates an alternative processor 1500 wide multiple cores 1502A-N, a set of one or more integrated memory controller unit(s) 1514 in the system agent unit 1510, and special purpose logic 1508.

Thus, different implementations of the processor 1500 may include: 1) a CPU with the special purpose logic 1508 being integrated graphics and/or scientific (throughput) logic (which may include one or more cores), and the cores 1502A-N being one or more general purpose cores (e.g., general purpose in-order cores, general purpose out-of-order cores, a combination of the two); 2) a coprocessor with the cores 1502A-N being a large number of special purpose cores intended primarily for graphics and/or scientific (throughput); and 3) a coprocessor with the cores 1502A-N being a large number of general purpose in-order cores. Thus, the processor 1500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1500 may be a part of and/or may be implemented on one or more substrates using any of a number of process technologies, such as, for example, BiCMOS, CMOS, or NMOS.

The memory hierarchy includes one or more levels of cache 1504 within the cores 1502A-N, a set or one or more shared cache units 1506, and external memory (not shown) coupled to the set of integrated memory controller units 1514. The set of shared cache units 1506 may include one or more mid-level caches, such as level 2 (L2), level 3 (L3), level 4 (L4), or other levels of cache, a last level cache (LLC), and/or combinations thereof. While in one embodiment a ring based interconnect unit 1512 interconnects the integrated graphics logic 1508, the set of shared cache units 1506, and the system agent unit 1510/integrated memory controller unit(s) 1514, alternative embodiments may use any number of well-known techniques for interconnecting such units. In one embodiment, coherency is maintained between one or more cache units 1506 and cores 1502A-N.

In some embodiments, one or more of the cores 1502A-N are capable of multi-threading. The system agent 1510 includes those components coordinating and operating cores 1502A-N. The system agent unit 1510 may include for example a power control unit (PCU) and a display unit. The PCU may be or include logic and components needed for regulating the power state of the cores 1502A-N and the integrated graphics logic 1508. The display unit is for driving one or more externally connected displays.

The cores 1502A-N may be homogenous or heterogeneous in terms of architecture instruction set; that is, two or more of the cores 1502A-N may be capable of execution the same instruction set, while others may be capable of executing only a subset of that instruction set or a different instruction set.

FIGS. 16-19 are block diagrams of example computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 16:
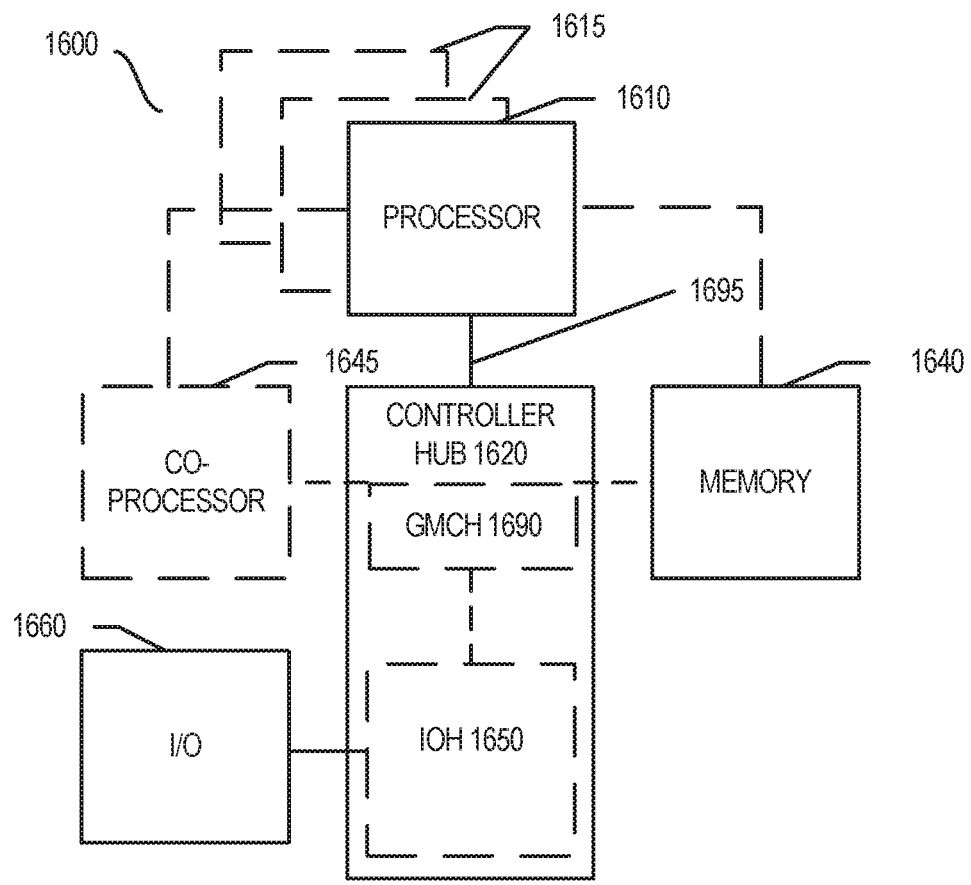
FIGS. 16-19 are block diagrams of example computer architectures.

Referring now to FIG. 16, shown is a block diagram of a system 1600 in accordance with an embodiment. The system 1600 may include one or more processors 1610, 1615, which are coupled to a controller hub 1620. In one embodiment the controller hub 1620 includes a graphics memory controller hub (GMCH) 1690 and an Input/Output Hub (IOH) 1650 (which may be on separate chips); the GMCH 1690 includes memory and graphics controllers to which are coupled memory 1640 and a coprocessor 1645; the IOH 1650 is couples input/output (I/O) devices 1660 to the GMCH 1690. Alternatively, one or both of the memory and graphics controllers are integrated within the processor (as described herein), the memory 1640 and the coprocessor 1645 are coupled directly to the processor 1610, and the controller hub 1620 in a single chip with the IOH 1650.

The optional nature of additional processors 1615 is denoted FIG. 16 with broken lines. Each processor 1610, 1615 may include one or more of the processing cores described herein and may be some version of the processor 1500.

The memory 1640 may be, for example, dynamic random access memory (DRAM), phase change memory (PCM), or a combination of the two. For at least one embodiment, the controller hub 1620 communicates with the processor(s) 1610, 1615 via a multi-drop bus, such as a frontside bus (FSB), point-to-point interface such as QuickPath Interconnect (QPI), or similar connection 1695.

In one embodiment, the coprocessor 1645 is a special-purpose processor, such as, for example, a high-throughput MIC processor, a network or communication processor, compression engine, graphics processor, GPGPU, embedded processor, or the like. In one embodiment, controller huh 1620 may include an integrated graphics accelerator.

There may be a variety of differences between the physical resources 1610, 1615 in terms of a spectrum of metrics of merit including architectural, microarchitectural, thermal, power consumption characteristics, and the like.

In one embodiment, the processor 1610 executes instructions that control data processing operations of a general type. Embedded within the instructions may be coprocessor instructions. The processor 1610 recognizes these coprocessor instructions as being of a type that should be executed by the attached coprocessor 1645. Accordingly, the processor 1610 issues these coprocessor instructions (or control signals representing coprocessor instructions) on a coprocessor bus or other interconnect, to coprocessor 1645. Coprocessor(s) 1645 accept and execute the received coprocessor instructions.

Figure 17:
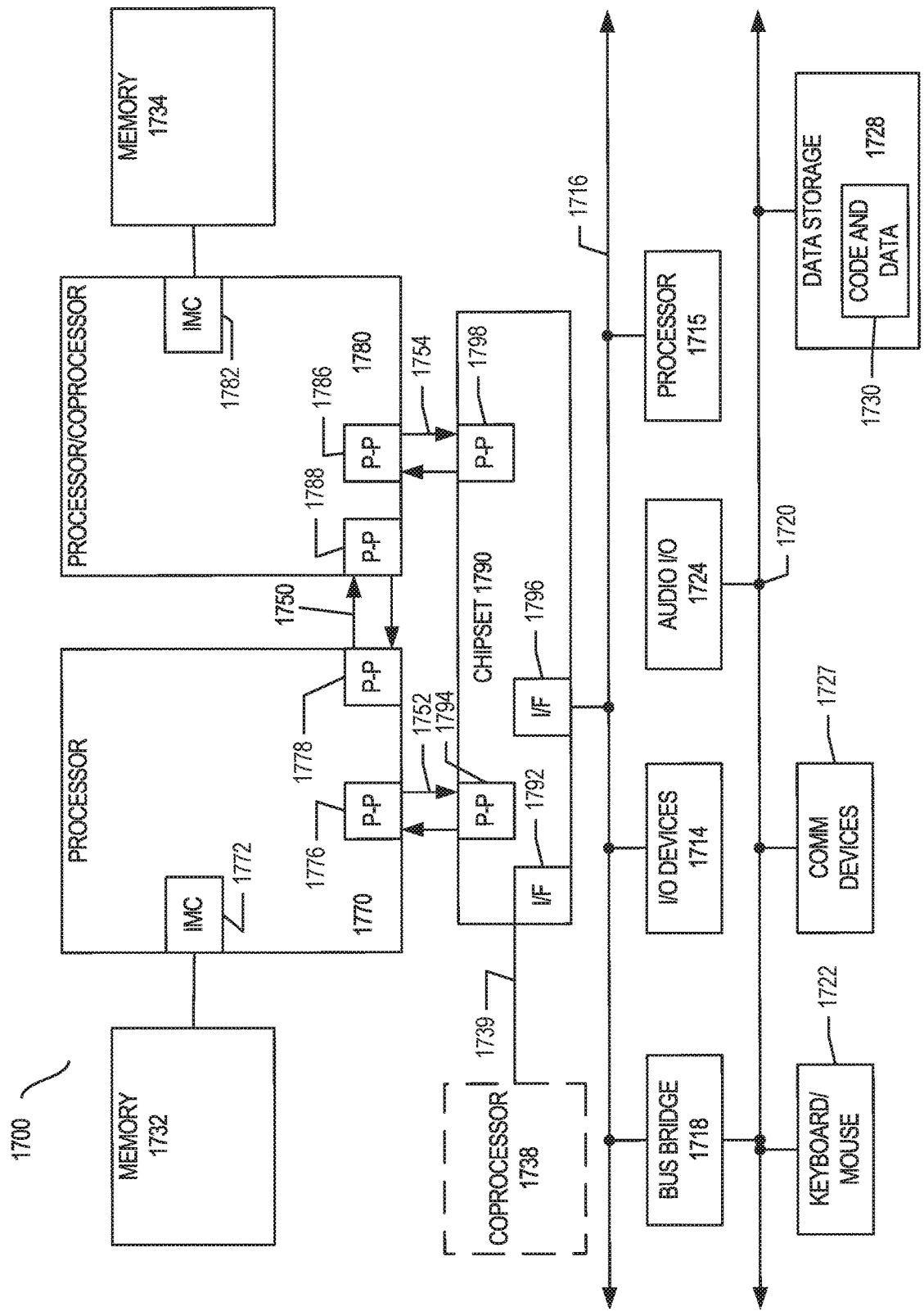

Referring now to FIG. 17, shown is a block diagram of a first more specific example system 1700 in accordance with an embodiment. As shown in FIG. 17, multiprocessor system 1700 is a point-to-point interconnect system, and includes a first processor 1770 and a second processor 1780 coupled via a point-to-point interconnect 1750. Each of processors 1770 and 1780 may be some version of the processor 1500. In an embodiment, processors 1770 and 1780 are respectively processors 1610 and 1615, while coprocessor 1738 is coprocessor 1645. In another embodiment, processors 1770 and 1780 are respectively processor 1610 coprocessor 1645.

Processors 1770 and 1780 are shown including integrated memory controller (IMC) units 1772 and 1782, respectively. Processor 1770 also includes as part of its bus controller units point-to-point (P-P) interfaces 1776 and 1778; similarly, second processor 1780 includes P-P interfaces 1786 and 1788. Processors 1770, 1780 may exchange information via a point-to-point (P-P) interface 1750 using P-P interface circuits 1778, 1788. As shown in FIG. 17, IMCs 1772 and 1782 couple the processors to respective memories, namely a memory 1732 and a memory 1734, which may be portions of main memory locally attached to the respective processors.

Processors 1770, 1780 may each exchange information with a chipset 1790 via individual P-P interfaces 1752, 1754 using point to point interface circuits 1776, 1794, 1786, 1798. Chipset 1790 may optionally exchange information with the coprocessor 1738 via a high-performance interface 1739. In one embodiment, the coprocessor 1738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1790 may be coupled to a first bus 1716 via an interface 1796. In one embodiment, first bus 1716 may be a Peripheral Component Interconnect (PCI) bus, or a bus such as a PCI Express bus or another third generation I/O interconnect bus, although the scope of the present techniques and configurations is not so limited.

As shown in FIG. 17, various I/O devices 1714 may be coupled to first bus 1716, along with a bus bridge 1718 which couples first bus 1716 to a second bus 1720. In one embodiment, one or more additional processors) 1715, such as coprocessors, high-throughput MIC processors, GPGPU's, accelerators (such as, e.g., graphics accelerators or digital signal processing (DSP) units), field programmable gate arrays, or any other processor, are coupled to first bus 1716. In one embodiment, second bus 1720 may be a low pin count (LPC) bus. Various devices may be coupled to a second bus 1720 including, for example, a keyboard and/or mouse 1722, communication devices 1727 and a storage unit 1728 such as a disk drive or other mass storage device which may include instructions/code and data 1730, in one embodiment. Further, an audio I/O 1724 may be coupled to the second bus 1720. Note that other architectures are possible. For example, instead of the point-to-point architecture of FIG. 17, a system may implement a multi-drop bus or other such architecture.

Figure 18:
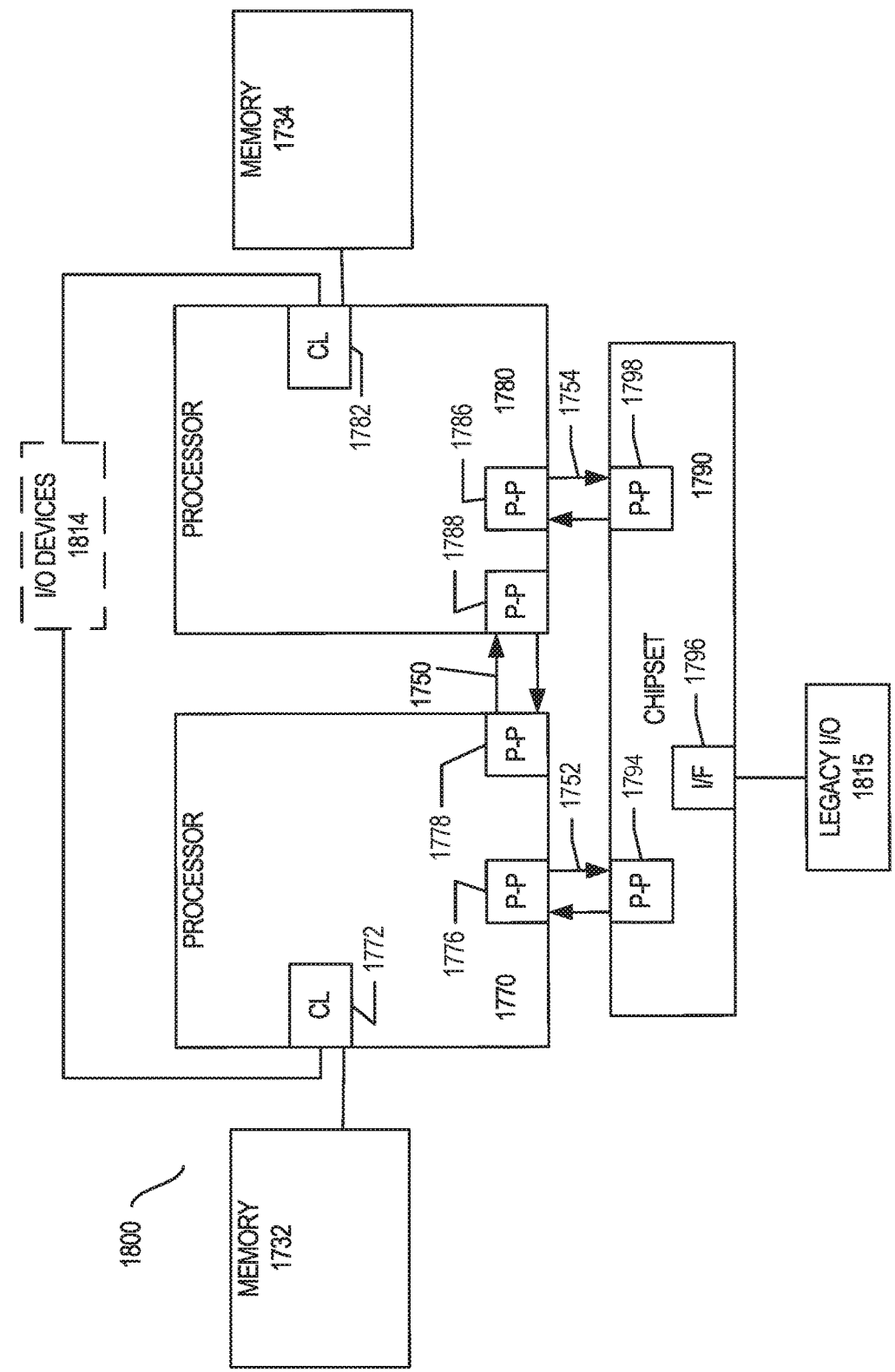

Referring now to FIG. 18, shown is a block diagram of a second more specific example system 1800 in accordance with an embodiment. Like elements in FIGS. 17 and 18 bear like reference numerals, and certain aspects of FIG. 17 have been omitted from FIG. 18 in order to avoid obscuring other aspects of FIG. 18.

FIG. 18 illustrates that the processors 1770, 1780 may include integrated memory and I/O control logic ("CL") 1772 and 1782, respectively. Thus, the CL 1772, 1782 include integrated memory controller units and include I/O control logic. FIG. 18 illustrates that not only are the memories 1732, 1734 coupled to the CL 1772, 1782, but also that I/O devices 1814 are also coupled to the control logic 1772, 1782. Legacy I/O devices 1815 are coupled to the chipset 1790.

Figure 19:
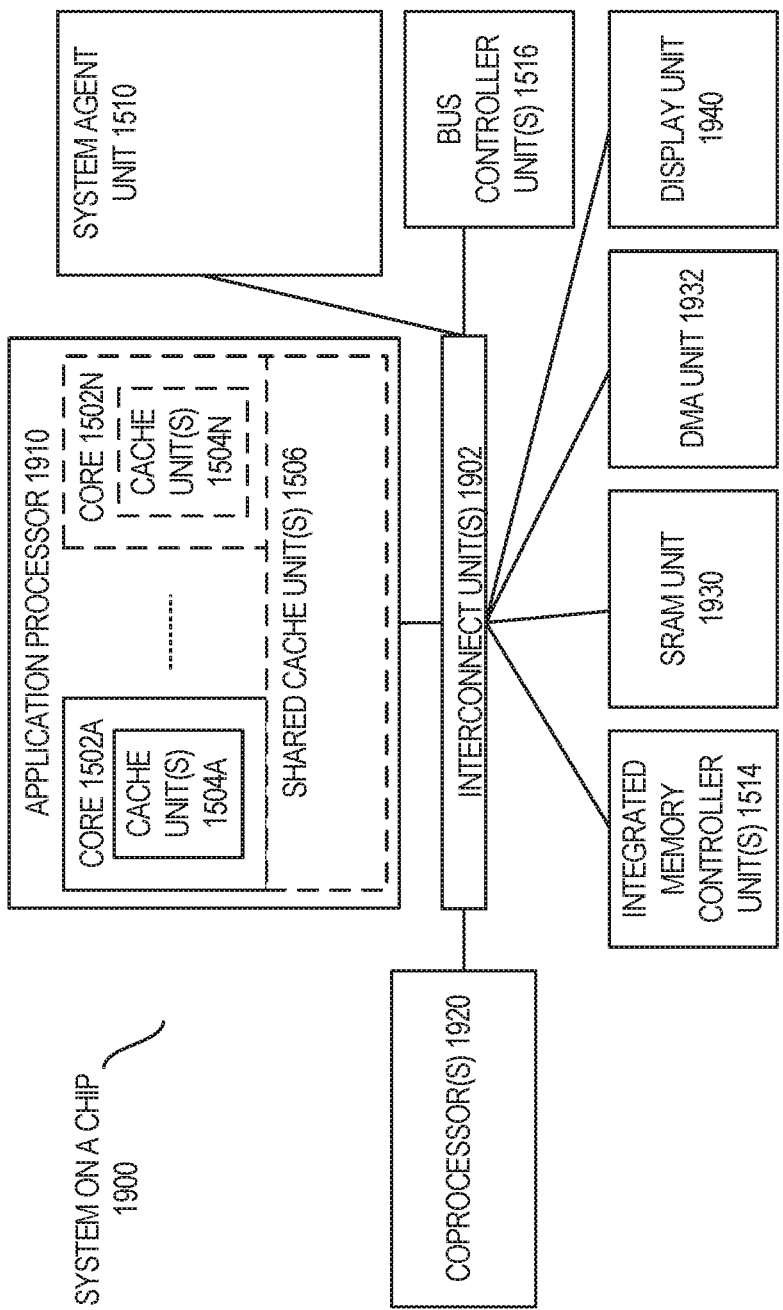

Referring now to FIG. 19, shown is a block diagram of a SoC 1900 in accordance with an embodiment. Similar elements in FIG. 18 bear like reference numerals. Also, dashed lined boxes are optional features on more advanced SoCs. In FIG. 19, an interconnect unit(s) 1902 is coupled to: an application processor 1910 which includes a set of one or more cores 202A-N and shared cache unit(s) 1506; a system agent unit 1510; a bus controller unit(s) 1516; an integrated memory controller unit(s) 1514; a set or one or more coprocessors 1920 which may include integrated graphics logic, an image processor, an audio processor, and a video processor; an static random access memory (SRAM) unit 1930; a direct memory access (DMA) unit 1932; and a display unit 1940 for coupling to one or more external displays. In one embodiment, the coprocessor(s) 1920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments may be implemented as computer programs or program code executing on programmable systems comprising at least one processor, a storage system (including volatile and non-volatile memory and/or storage elements), at least one input device, and at least one output device.

Program code, such as code 1730 illustrated in FIG. 17, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 20:
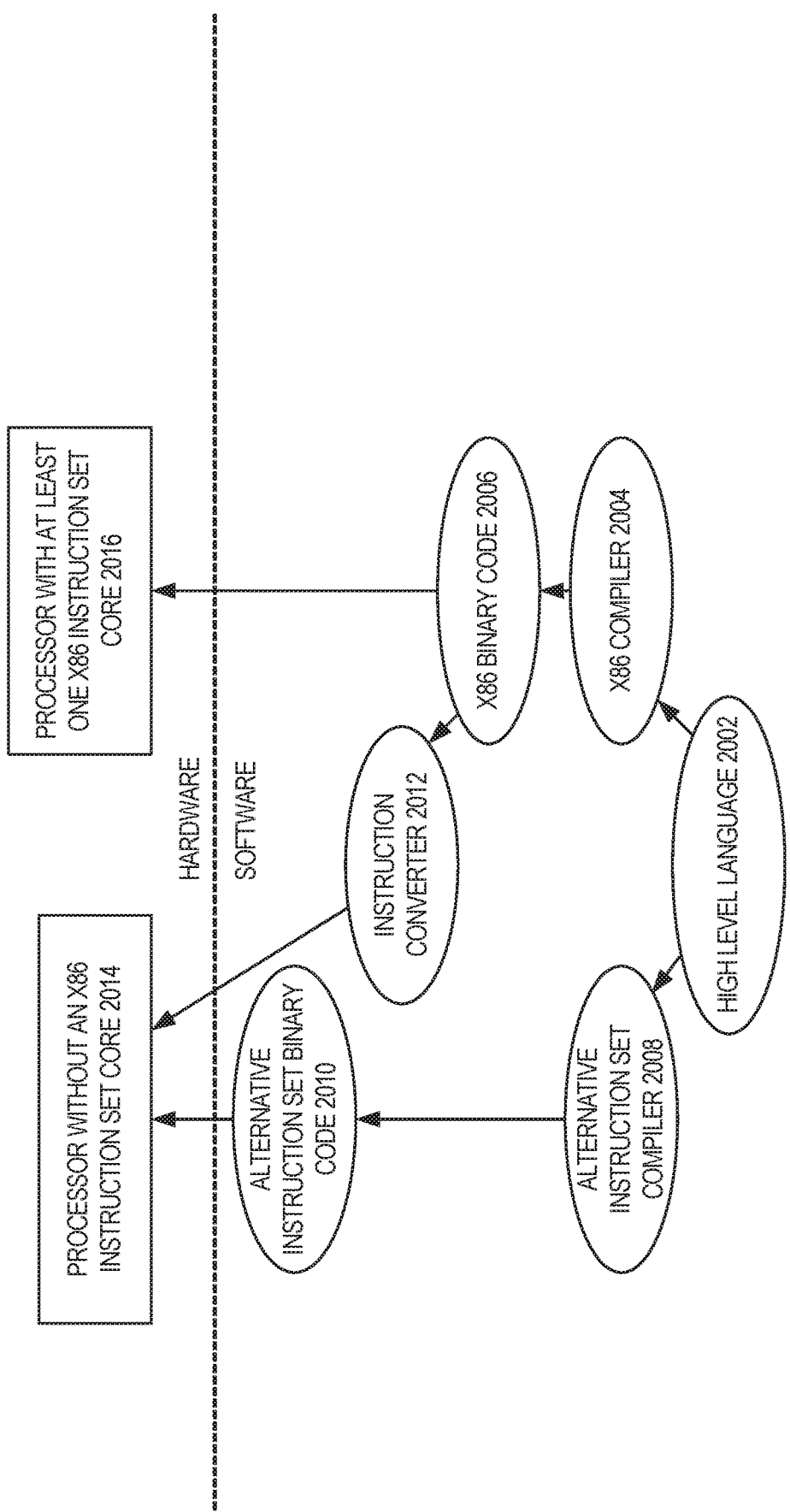
FIG. 20 is a block diagram contrasting the use of a software instruction converter to convert binary instructions in a source instruction set to binary instructions in a target instruction set according to various embodiments.

FIG. 20 is a block diagram contrasting the use of a software instruction converter to convert binary instructions in a source instruction set to binary instructions in a target instruction set according to various embodiments. In the illustrated embodiment, the instruction converter is a software instruction converter, although alternatively the instruction converter may be implemented in software, firmware, hardware, or various combinations thereof. FIG. 20 shows a program in a high level language 2002 may be compiled using an x86 compiler 2004 to generate x86 binary code 2006 that may be natively executed by a processor with at least one x86 instruction set core 2016. The processor with at least one x86 instruction set core 2016 represents any processor that may perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2004 represents a compiler that is operable to generate x86 binary code 2006 (e.g., object code) that may, with or without additional linkage processing, be executed on the processor with at least one x86 instruction set core 2016. Similarly, FIG. 20 shows the program in the high level language 2002 may be compiled using an alternative instruction set compiler 2008 to generate alternative instruction set binary code 2010 that may be natively executed by a processor without at least one x86 instruction set core 2014 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2012 is used to convert the x86 binary code 2006 into code that may be natively executed by the processor without an x86 instruction set core 2014. This converted code is not likely to be the same as the alternative instruction set binary code 2010 because an instruction converter capable of this is difficult to make; however, the converted code will accomplish the general operation and be made up of instructions from the alternative instruction set. Thus, the instruction converter 2012 represents software, firmware, hardware, or a combination thereof that, through emulation, simulation or any other process, allows a processor or other electronic device that does not have an x86 instruction set processor or core to execute the x86 binary code 2006.

ADDITIONAL NOTES & EXAMPLES

Example 1 is a system for neuromorphic accelerator multitasking, the system comprising: an axon processor; and a neuron address translation unit (NATU), the NATU including: a first interface to receive a spike message, the spike message including a physical neuron identifier (PNID) of a neuron causing the spike; processing circuitry to: translate the PNID into a network identifier (NID) and a local neuron identifier (LNID); and locate synapse data based on the NID; and a second interface to communicate the synapse data and the LNID to an axon processor.

In Example 2, the subject matter of Example 1 includes, wherein the synapse data includes a memory address range.

In Example 3, the subject matter of Examples 1-2 includes, wherein, to translate the PNID into the NID and the LNID, the processing circuitry compares the PNID to a set of PNID ranges, each PNID range corresponding to a unique NID.

In Example 4, the subject matter of Examples 1-3 includes, wherein the LNID is calculated by subtracting a PNID-begin value from the PNID, wherein a member of the set of PNID ranges includes a PNID_begin and PNID_end pair that respectively hold a smallest PNID and a largest PNID that correspond to a NID.

In Example 5, the subject matter of Examples 1-4 includes, wherein, to translate the PNID into the NID and the LNID, the processing circuitry removes a number of bits corresponding to a NID length from an end of the PNID.

In Example 6, the subject matter of Examples 1-5 includes, wherein the NATU is packaged with the axon processor.

In Example 7, the subject matter of Examples 1-6 includes, neural processor clusters connected via an interconnect to the axon processor.

In Example 8, the subject matter of Example 7 includes, wherein the axon processor determines that a second spike message is addressed to the LNID based on a synapse structure located from the synapse data, and wherein the processing circuitry translates the LNID into the PNID using the NID corresponding to the synapse data, and wherein the processing circuitry communicates the second spike message to the axon processor using the PNID to identify the neuron.

In Example 9, the subject matter of Example 8 includes, wherein the PNID is calculated by adding a PNID_begin value to the LNID, wherein the PNID_begin value corresponds to a PNID range of the NID.

In Example 10, the subject matter of Examples 8-9 includes, wherein, to translate the LNID into the PNID, the processing circuitry concatenates the NID onto an end of the LNID.

In Example 11, the subject matter of Examples 7-10 includes, a power supply to provide power to components of the system, the power supply including an interface to provide power via mains power or a battery.

In Example 12, the subject matter of Examples 1-11 includes, a neuron processor control unit to: receive a neural network clone indication that includes the NID; and establish a second neuron memory, equivalent to a first neuron memory corresponding to the NID, to a second region of a memory that contains neuron memory, wherein the processing circuitry is to: assign a second NID to the second neuron memory; and update translation information for the second NID to create a correspondence between the second NID and the synapse data.

In Example 13, the subject matter of Example 12 includes, wherein the translation information includes a NID specific data structure with pointers into synapse memory for a given NID, and wherein a first NID data structure for the NID anti a second NID data structure for the second NID include pointers to synapse memory space that are the same.

In Example 14, the subject matter of Examples 12-13 includes, wherein, to establish the second neuron memory, the neuron processor control unit copies the first neuron memory.

In Example 15, the subject matter of Examples 12-14 includes, wherein to establish the second neuron memory, the neuron processor control unit randomizes neural state of neurons copied from the first neuron memory.

In Example 16, the subject matter of Examples 1-15 includes, wherein the axon processor is to update a synapse structure in the synapse data based on a training event corresponding to the first NID.

In Example 17, the subject matter of Example 16 includes, wherein the system is to invoke a neural network corresponding to the second NID simultaneously with the neural network corresponding to the NID, wherein both the neural network corresponding to the second NID and the neural network corresponding to the NID use the synapse structure.

Example 18 is a method for neuromorphic accelerator multitasking, the method comprising: receiving, at a neuron address translation unit (NATU), a spike message, the spike message including a physical neuron identifier (PNID) of a neuron causing the spike; translating, by the NATU, the PNID into a network identifier (NID) and a local neuron identifier (LNID); locating, by the NATU, synapse data based on the NID; and communicating, by the NATU, the synapse data and the LNID to an axon processor.

In Example 19, the subject matter of Example 18 includes, wherein the synapse data includes a memory address range.

In Example 20, the subject matter of Examples 18-19 includes, wherein translating the PNID into the NID and the LNID includes comparing the PNID to a set of PNID ranges, each PNID range corresponding to a unique NID.

In Example 21, the subject matter of Examples 18-20 includes, wherein the LNID is calculated by subtracting a PNID_begin value from the PNID, wherein a member of the set of PNID ranges includes a PNID_begin and PNID_end pair that respectively hold a smallest PNID and a largest PNID that correspond to a NID.

In Example 22, the subject matter of Examples 18-21 includes, wherein translating the PNID into the NID and the LNID includes removing a number of bits corresponding to a NID length from an end of the PNID.

In Example 23, the subject matter of Examples 18-22 includes, wherein the NATU is packaged with the axon processor.

In Example 24, the subject matter of Examples 18-23 includes, wherein the axon processor is part of a system that includes neural processor clusters connected via an interconnect to the axon processor.

In Example 25, the subject matter of Example 24 includes, determining, by the axon processor, that a second spike message is addressed to the LNID based on a synapse structure located from the synapse data; translating, by the NATU, the LNID into the PNID using the NID corresponding to the synapse data; and communicating the second spike message to the axon processor using the PNID to identify the neuron.

In Example 26, the subject matter of Example 25 includes, wherein the PNID is calculated by adding a PNID_begin value to the LNID, wherein the PNID_begin value corresponds to a PNID range of the NID.

In Example 27, the subject matter of Examples 25-26 includes, wherein translating the LNID into the PNID includes concatenating the NID onto an end of the LNID.

In Example 28, the subject matter of Examples 24-27 includes, wherein the system includes a power supply to provide power to components of the system, the power supply including an interface to provide power via mains power or a battery.

In Example 29, the subject matter of Examples 18-28 includes, receiving a neural network clone indication that includes the NID; establishing a second neuron memory, equivalent to a first neuron memory corresponding to the NID, to a second region of a memory that contains neuron memory; assigning a second NID to the second neuron memory; updating NATU information for the second NID to create a correspondence between the second NID and the synapse data.

In Example 30, the subject matter of Example 29 includes, wherein the NATU information includes a NID specific data structure with pointers into synapse memory for a given NID, and wherein a first NID data structure for the NID and a second NID data structure for the second NID include pointers to synapse memory space that are the same.

In Example 31, the subject matter of Examples 29-30 includes, wherein establishing the second neuron memory includes copying the first neuron memory.

In Example 32, the subject matter of Examples 29-31 includes, wherein establishing the second neuron memory includes randomizing neural state of neurons copied from the first neuron memory.

In Example 33, the subject matter of Examples 18-32 includes, updating a synapse structure in the synapse data based on a training event corresponding to the first NID.

In Example 34, the subject matter of Example 33 includes, invoking a neural network corresponding to the second NID simultaneously with the neural network corresponding to the NID, wherein both the neural network corresponding to the second NID and the neural network corresponding to the NID use the synapse structure.

Example 35 is at least one machine readable medium including instructions for neuromorphic accelerator multitasking, the instruction, when executed by processing circuitry, cause the processing circuitry to perform operations comprising: receiving, at a neuron address translation unit (NATU), a spike message, the spike message including a physical neuron identifier (PNID) of a neuron causing the spike; translating, by the NATU, the PNID into a network identifier (NID) and a local neuron identifier (LNID); locating, by the NATU, synapse data based on the NID; and communicating, by the NATU, the synapse data and the LNID to an axon processor.

In Example 36, the subject matter of Example 35 includes, wherein the synapse data includes a memory address range.

In Example 37, the subject matter of Examples 35-36 includes, wherein translating the PNID into the NID and the LNID includes comparing the PNID to a set of PNID ranges, each PNID range corresponding to a unique NID.

In Example 38, the subject matter of Examples 35-37 includes, wherein the LNID is calculated by subtracting a PNID_begin value from the PNID, wherein a member of the set of PNID ranges includes a PNID_begin and PNID_end pair that respectively hold a smallest PNID and a largest PNID that correspond to a NID.

In Example 39, the subject matter of Examples 35-38 includes, wherein translating the PNID into the NID and the LNID includes removing a number of bits corresponding to a NID length from an end of the PNID.

In Example 40, the subject matter of Examples 35-39 includes, wherein the NATU is packaged with the axon processor.

In Example 41, the subject matter of Examples 35-40 includes, wherein the axon processor is part of a system that includes neural processor clusters connected via an interconnect to the axon processor.

In Example 42, the subject matter of Example 41 includes, wherein the operations include: determining, by the axon processor, that a second spike message is addressed to the LNID based on a synapse structure located from the synapse data; translating, by the NATU, the LNID into the PNID using the NID corresponding to the synapse data; and communicating the second spike message to the axon processor using the PNID to identify the neuron.

In Example 43, the subject matter of Example 42 includes, wherein the PNID is calculated by adding a PNID_begin value to the LNID, wherein the PNID_begin value corresponds to a PNID range of the NID.

In Example 44, the subject matter of Examples 42-43 includes, wherein translating the LNID into the PNID includes concatenating the NID onto an end of the LNID.

In Example 45, the subject matter of Examples 41-44 includes, wherein the system includes a power supply to provide power to components of the system, the power supply including an interface to provide power via mains power or a battery.

In Example 46, the subject matter of Examples 35-45 includes, wherein the operations include: receiving a neural network clone indication that includes the NID; establishing a second neuron memory, equivalent to a first neuron memory corresponding to the NID, to a second region of a memory that contains neuron memory; assigning a second NID to the second neuron memory; updating NATU information for the second NID to create a correspondence between the second NID and the synapse data.

In Example 47, the subject matter of Example 46 includes, wherein the NATU information includes a NID specific data structure with pointers into synapse memory for a given NID, and wherein a first NID data structure for the NID and a second NID data structure for the second NID include pointers to synapse memory space that are the same.

In Example 48, the subject matter of Examples 46-47 includes, wherein establishing the second neuron memory includes copying the first neuron memory.

In Example 49, the subject matter of Examples 46-48 includes, wherein establishing the second neuron memory includes randomizing neural state of neurons copied from the first neuron memory.

In Example 50, the subject matter of Examples 35-49 includes, wherein the operations include updating a synapse structure in the synapse data based on a training event corresponding to the first NID.

In Example 51, the subject matter of Example 50 includes, wherein the operations include invoking a neural network corresponding to the second NID simultaneously with the neural network corresponding to the NID, wherein both the neural network corresponding to the second NID and the neural network corresponding to the NID use the synapse structure.

Example 52 is a system for neuromorphic accelerator multitasking, the system comprising: means for receiving a spike message, the spike message including a physical neuron identifier (PNID) of a neuron causing the spike; means for translating the PNID into a network identifier (NID) and a local neuron identifier (LNID); means for locating synapse data based on the NID; and means for communicating the synapse data and the LNID to an axon processor.

In Example 53, the subject matter of Example 52 includes, wherein the synapse data includes a memory address range.

In Example 54, the subject matter of Examples 52-53 includes, wherein the means for translating the PNID into the NID and the LNID include means for comparing the PNID to a set of PNID ranges, each PNID range corresponding to a unique NID.

In Example 55, the subject matter of Examples 52-54 includes, wherein the LNID is calculated by subtracting a PNID_begin value from the PNID, wherein a member of the set of PNID ranges includes a PNID_begin and PNID_end pair that respectively hold a smallest PNID and a largest PNID that correspond to a NID.

In Example 56, the subject matter of Examples 52-55 includes, wherein the means for translating the PNID into the NID and the LNID include means for removing a number of bits corresponding to a NID length from an end of the PNID.

In Example 57, the subject matter of Examples 52-56 includes, wherein the means for translating the PNID is packaged with the axon processor.

In Example 58, the subject matter of Examples 52-57 includes, the axon processor and neural processor clusters connected via an interconnect to the axon processor.

In Example 59, the subject matter of Example 58 includes, means for determining, by the axon processor, that a second spike message is addressed to the LNID based on a synapse structure located from the synapse data; means for translating the LNID into the PNID using the NID corresponding to the synapse data; and means for communicating the second spike message to the axon processor using the PNID to identify the neuron.

In Example 60, the subject matter of Example 59 includes, wherein the PNID is calculated by adding a PNID_begin value to the LNID, wherein the PNID_begin value corresponds to a PNID range of the NID.

In Example 61, the subject matter of Examples 59-60 includes, wherein the means for translating the LNID into the PNID include means for concatenating the NID onto an end of the LNID.

In Example 62, the subject matter of Examples 58-61 includes, a power supply to provide power to components of the system, the power supply including an interface to provide power via mains power or a battery.

In Example 63, the subject matter of Examples 52-62 includes, means for receiving a neural network clone indication that includes the NID; means for establishing a second neuron memory, equivalent to a first neuron memory corresponding to the NID, to a second region of a memory that contains neuron memory; means for assigning a second NID to the second neuron memory; means for updating translation information for the second NID to create a correspondence between the second NID and the synapse data.

In Example 64, the subject matter of Example 63 includes, wherein the translation information includes a NID specific data structure with pointers into synapse memory for a given NID, and wherein a first NID data structure for the NID and a second NID data structure for the second NID include pointers to synapse memory space that are the same.

In Example 65, the subject matter of Examples 63-64 includes, wherein the means for establishing the second neuron memory include means for copying the first neuron memory.

In Example 66, the subject matter of Examples 63-65 includes, wherein the means for establishing the second neuron memory include means for randomizing neural state of neurons copied from the first neuron memory.

In Example 67, the subject matter of Examples 52-66 includes, means for updating a synapse structure in the synapse data based on a training event corresponding to the first NID.

In Example 68, the subject matter of Example 67 includes, means for invoking a neural network corresponding to the second NID simultaneously with the neural network corresponding to the NID, wherein both the neural network corresponding to the second NID and the neural network corresponding to the NID use the synapse structure.

Example 69 is at least one machine-readable medium including instructions that, when executed by processing circuitry, cause the processing circuitry to perform operations to implement of any of Examples 1-68.

Example 70 is an apparatus comprising means to implement of any of Examples 1-68.

Example 71 is a system to implement of any of Examples 1-68.

Example 72 is a method to implement of any of Examples 1-68.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A system for neuromorphic accelerator multitasking, the system comprising:
   an axon processor; and
   a neuron address translation circuitry (NATC), the NATC including:
   a first interface to receive a spike message, the spike message including a physical neuron identifier (PNID) of a neuron causing the spike;
   processing circuitry to:
   translate the PNID into a neural network identifier (NID) and a local neuron identifier (LNID), wherein the PNID globally identifies the neuron causing the spike and the LNID is scoped to a neural network identified by the NID, wherein the system hosts multiple neural networks that each have a unique NID, and wherein the same LNID in the multiple neural networks maps to a different neuron PNID; and
   locate synapse data based on the NID; and
   a second interface to communicate the synapse data and the LNID to the axon processor, wherein the LNID is used to determine a subset of the synapse data to which the spike message pertains.

2. The system of claim 1, wherein the synapse data includes a memory address range.

3. The system of claim 1, wherein, to translate the PNID into the NID and the LNID, the processing circuitry compares the PNID to a plurality of PNID ranges, each PNID range corresponding to a unique NID.

4. The system of claim 1, wherein the LNID is calculated by subtracting a PNID_begin value from the PNID, wherein a member of the plurality of PNID ranges includes a PNID_begin and PNID_end pair that respectively hold a smallest PNID and a largest PNID that correspond to a NID.

5. The system of claim 1, comprising a neural processor cluster connected via an interconnect to the axon processor.

6. The system of claim 5, comprising a power supply to provide power to components of the system, the power supply including an interface to provide power via mains power or a battery.

7. The system of claim 1, comprising:
   a memory comprising a neuron data region to store neuron data and a first neuron memory region corresponding to the NID; and
   neuron processor control circuitry to:
   receive a neural network clone indication comprising the NID;
   establish a second neuron memory region in the neuron data region of the memory, responsive to receiving the neural network clone indication, wherein the second neuron memory region is equivalent to the first neuron memory region;
   wherein the processing circuitry, responsive to the second neuron memory region being established, is further to:
   assign a second NID to the second neuron memory region; and
   update translation information for the second NID to create a correspondence between the second NID and the synapse data.

8. The system of claim 7, wherein the translation information includes a NID specific data structure with pointers into synapse memory for a given NID, and wherein a first NID data structure for the NID and a second NID data structure for the second NID include pointers to synapse memory space that, are the same.

9. The system of claim 1, wherein the axon processor is to update a synapse structure in the synapse data based on a training event corresponding to the first NID.

10. A method for neuromorphic accelerator multitasking, the method comprising:
   receiving, at a neuron address translation unit (NATC), a spike message, the spike message including a physical neuron identifier (PNID) of a neuron causing the spike;
   translating, by the NATC, the PNID into a neural network identifier (NID) and a local neuron identifier (LNID), wherein the PNID globally identifies the neuron causing the spike and the LNID is scoped to a neural network identified by the NID, wherein the system hosts multiple neural networks that each have a unique NID, and wherein the same LNID in the multiple neural networks maps to a different neuron PNID;
   locating, by the NATC, synapse data based on the NID; and
   communicating, by the NATC, the synapse data and the LNID to an axon processor, wherein the LNID is used to determine a subset of the synapse data to which the spike message pertains.

11. The method of claim 10, wherein translating the PNID into the NID and the LNID includes comparing the PNID to a plurality of PNID ranges, each PNID range corresponding to a unique NID.

12. The method of claim 10, wherein the LNID is calculated by subtracting a PNID_begin value from the PNID, wherein a member of the plurality of PNID ranges includes a PNID_begin and PNID_end pair that respectively hold a smallest PNID and a largest PNID that correspond to a NID.

13. The method of claim 10, wherein the axon processor is part of a system that includes neural processor clusters connected via an interconnect to the axon processor.

14. The method of claim 13, wherein the system includes a power supply to provide power to components of the system, the power supply including an interface to provide power via mains power or a battery.

15. The method of claim 10, comprising:
receiving a neural network clone indication that includes the NID;
establishing a second neuron memory, equivalent to a first neuron memory corresponding to the NID, to a second region of a memory that contains neuron memory;
assigning a second NID to the second neuron memory;
updating NATC information for the second NID to create a correspondence between the second NID and the synapse data.

16. The method of claim 15, wherein the NATC information includes a NID specific data structure with pointers into synapse memory for a given NID, and wherein a first NID data structure for the NID and a second NID data structure for the second NID include pointers to synapse memory space that are the same.

17. At least one non-transitory machine readable medium including instructions for neuromorphic accelerator multitasking, the instruction, when executed by processing circuitry, cause the processing circuitry to perform operations comprising:
receiving, at a neuron address translation unit (NATC), a spike message, the spike message including a physical neuron identifier (PNID) of a neuron causing the spike;
translating, by the NATC, the PNID into a neural network identifier (NID) and a local neuron identifier (LNID), wherein the PNID globally identifies the neuron causing the spike and the LNID is scoped to a neural network identified by the NID, wherein the system hosts multiple neural networks that each have a unique NID, and wherein the same LNID in the multiple neural networks maps to a different neuron PNID;
locating, by the NATC, synapse data based on the NID; and
communicating, by the NATC, the synapse data and the LNID to an axon processor, wherein the LNID is used to determine a subset of the synapse data to which the spike message pertains.

18. The at least one non-transitory machine readable medium of claim 17, wherein the synapse data includes a memory address range.

19. The at least one non-transitory machine readable medium of claim 17, wherein translating the PNID into the NID and the LNID includes comparing the PNID to a plurality of PNID ranges, each PNID range corresponding to a unique NID.

20. The at least one non-transitory machine readable medium of claim 17, wherein the LNID is calculated by subtracting a PNID_begin value from the PNID, wherein a member of the plurality of PNID ranges includes a PNID_begin and PNID_end pair that respectively hold a smallest PNID and a largest PNID that correspond to a NID.

21. The at least one non-transitory machine readable medium of claim 17, wherein the axon processor is part of a system that includes neural processor clusters connected via an interconnect to the axon processor.

22. The at least one non-transitory machine readable medium of claim 21, wherein the system includes a power supply to provide power to components of the system, the power supply including an interface to provide power via mains power or a battery.

23. The at least one non-transitory machine readable medium of claim 17, wherein the operations include:
receiving a neural network clone indication that includes the NID;
establishing a second neuron memory, equivalent to a first neuron memory corresponding to the NID, to a second region of a memory that contains neuron memory;
assigning a second NID to the second neuron memory;
updating NATC information for the second NID to create a correspondence between the second NID and the synapse data.

24. The at least one non-transitory machine readable medium of claim 23, wherein the NATC information includes a NID specific data structure with pointers into synapse memory for a given NID, and wherein a first NID data structure for the NID and a second NID data structure for the second NID include pointers to synapse memory space that are the same.

25. The at least one non-transitory machine readable medium of claim 17, wherein the operations include updating a synapse structure in the synapse data based on a training event corresponding to the first NID.

\* \* \* \* \*

UNITED STATES PATENT AND TRADEMARK OFFICE
CERTIFICATE OF CORRECTION

| | |
|---|---|
| PATENT NO. | : 11,366,998 B2 |
| APPLICATION NO. | : 15/937486 |
| DATED | : June 21, 2022 |
| INVENTOR(S) | : Pugsley et al. |

It is certified that error appears in the above-identified patent and that said Letters Patent is hereby corrected as shown below:

In the Claims

In Column 38, Line 27, in Claim 8, delete "that," and insert --that-- therefor

In Column 40, Line 12, in Claim 21, delete "dusters" and insert --clusters-- therefor Signed and Sealed this
Thirty-first Day of January, 2023

Katherine Kelly Vidal
Director of the United States Patent and Trademark Office